United States Patent
Nakada et al.

(10) Patent No.: US 9,438,792 B2
(45) Date of Patent: Sep. 6, 2016

(54) IMAGE-PROCESSING APPARATUS AND IMAGE-PROCESSING METHOD FOR GENERATING A VIRTUAL ANGLE OF VIEW

(71) Applicant: CANON KABUSHIKI KAISHA, Tokyo (JP)

(72) Inventors: Yuichi Nakada, Yokohama (JP); Yosuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/264,306

(22) Filed: Apr. 29, 2014

(65) Prior Publication Data

US 2014/0340543 A1    Nov. 20, 2014

(30) Foreign Application Priority Data

May 17, 2013  (JP) ................................. 2013-105157

(51) Int. Cl.
| | |
|---|---|
| H04N 5/232 | (2006.01) |
| H04N 9/09 | (2006.01) |
| H04N 13/00 | (2006.01) |
| H04N 5/262 | (2006.01) |

(52) U.S. Cl.
CPC ...... H04N 5/23229 (2013.01); H04N 5/23296 (2013.01); H04N 5/2627 (2013.01); H04N 9/09 (2013.01); H04N 13/0011 (2013.01)

(58) Field of Classification Search
USPC ...................................................... 348/218.1
See application file for complete search history.

(56) References Cited

U.S. PATENT DOCUMENTS

| | | | |
|---|---|---|---|
| 6,259,470 B1 * | 7/2001 | Koizumi et al. | 348/14.1 |
| 6,903,735 B2 * | 6/2005 | Jeong et al. | 345/418 |
| 7,570,803 B2 * | 8/2009 | Criminisi et al. | 382/154 |
| 8,511,835 B2 | 8/2013 | Sato | |
| 2004/0061787 A1 * | 4/2004 | Liu et al. | 348/218.1 |
| 2004/0196379 A1 * | 10/2004 | Chen et al. | 348/218.1 |
| 2009/0207179 A1 * | 8/2009 | Huang et al. | 345/505 |
| 2012/0170841 A1 * | 7/2012 | Lee | G06T 15/20 382/166 |
| 2013/0058591 A1 | 3/2013 | Nishiyama et al. | |
| 2013/0176373 A1 | 7/2013 | Huang | |
| 2013/0343636 A1 | 12/2013 | Sato et al. | |

FOREIGN PATENT DOCUMENTS

JP           4341019 B2      10/2009

* cited by examiner

*Primary Examiner* — Twyler Haskins
*Assistant Examiner* — Akshay Trehan
(74) *Attorney, Agent, or Firm* — Fitzpatrick, Cella, Harper & Scinto

(57) ABSTRACT

An image-processing apparatus obtains first image data having a first angle of view and second image data having a second angle of view smaller than the first angle of view. The image-processing apparatus then generates third image data by performing weighted combination of the first image data and the second image data, the third image data having a third angle of view determined according to a user command and being smaller than the first angle of view but larger than the second angle of view. Weights used in this weighted combination are such that the closer the third angle of view is to the second angle of view, the larger is the weight on the second image data relative to the weight on the first image data.

16 Claims, 19 Drawing Sheets

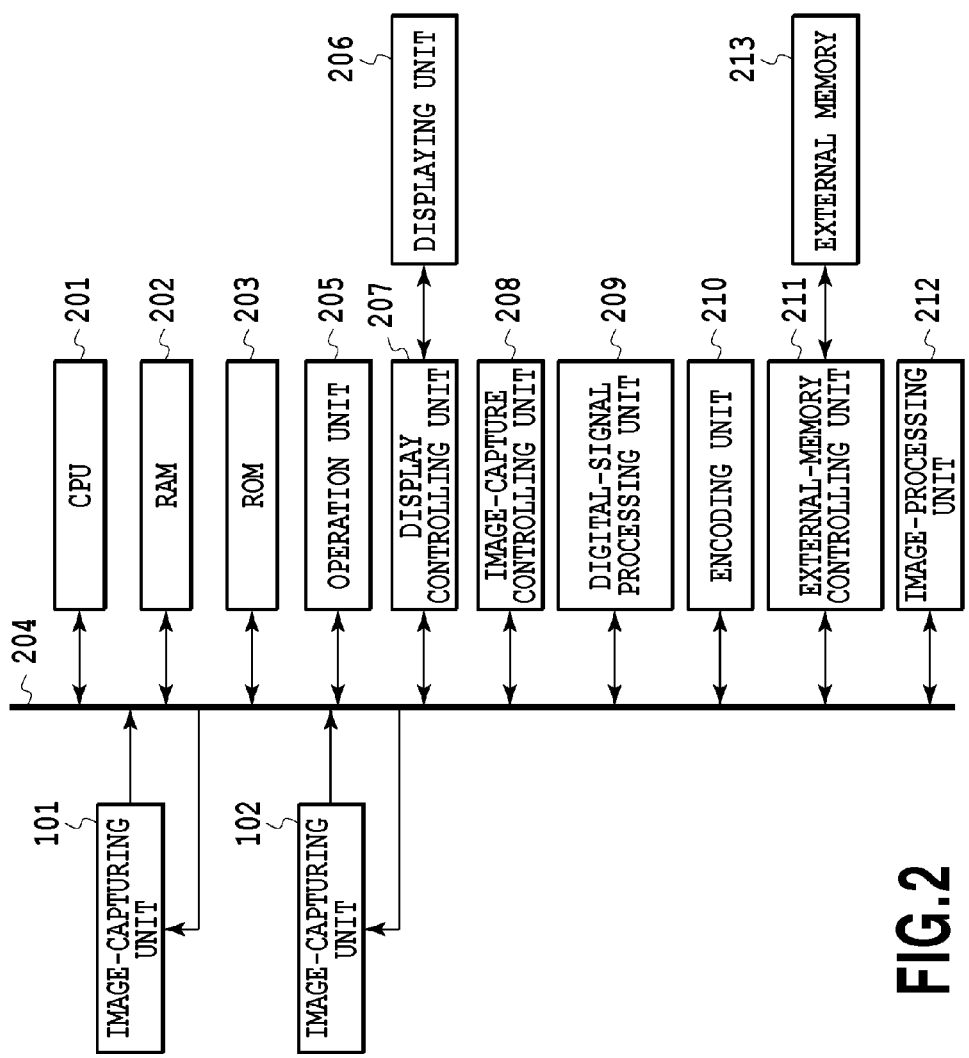

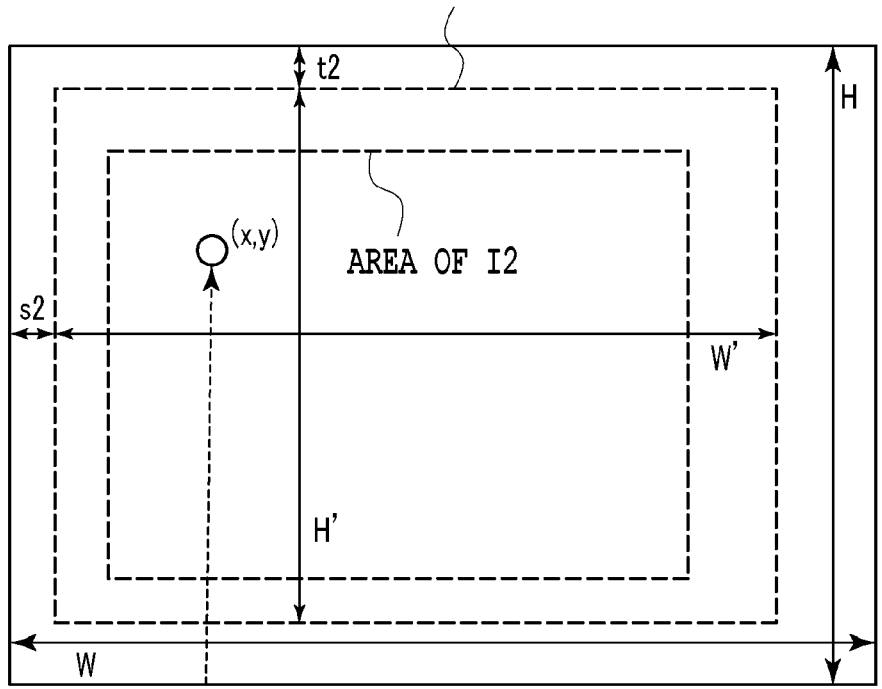
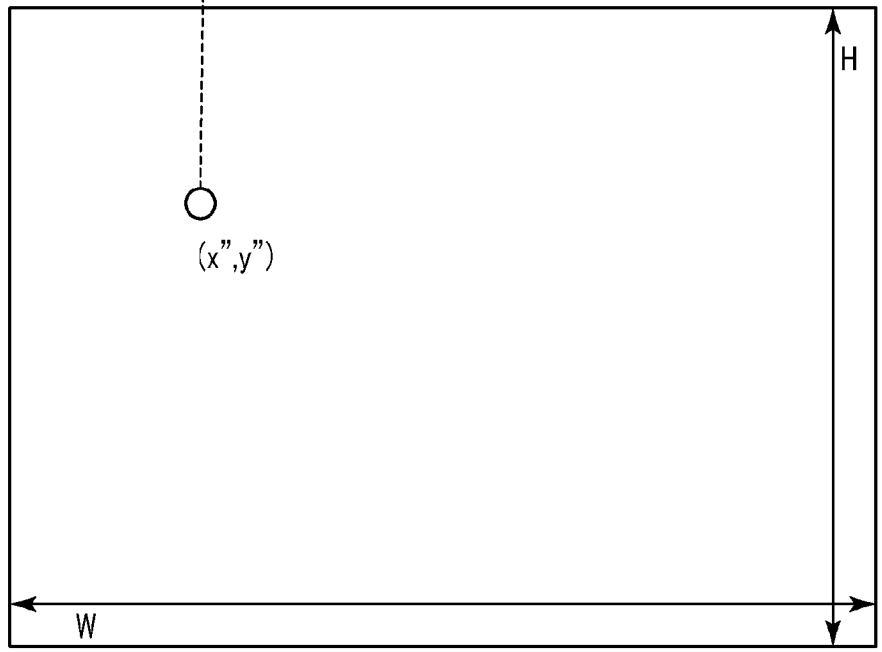
FIG.9

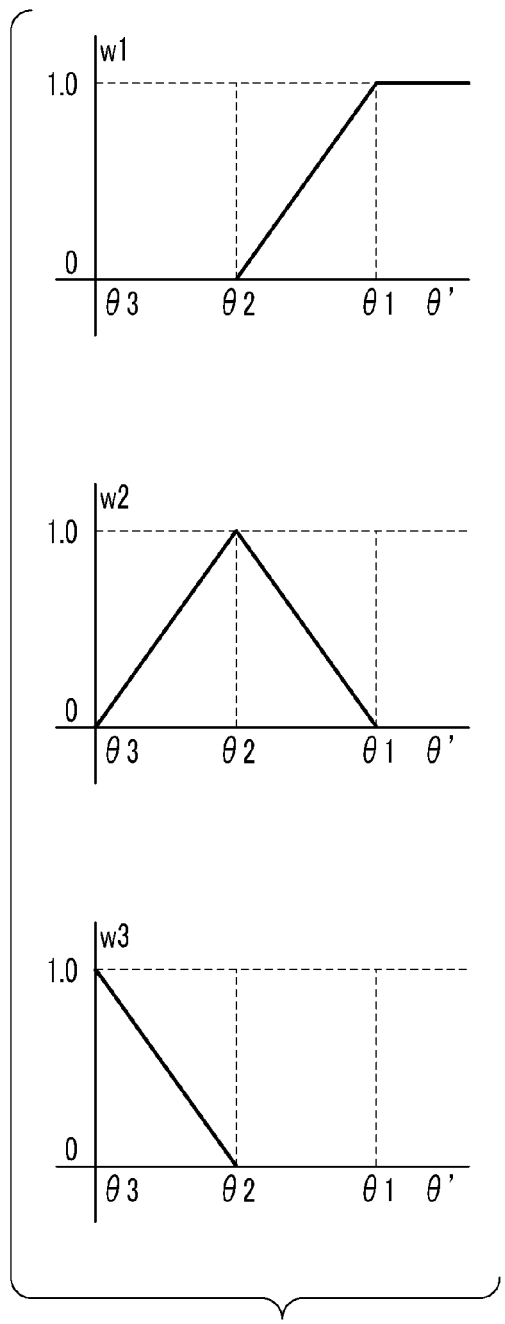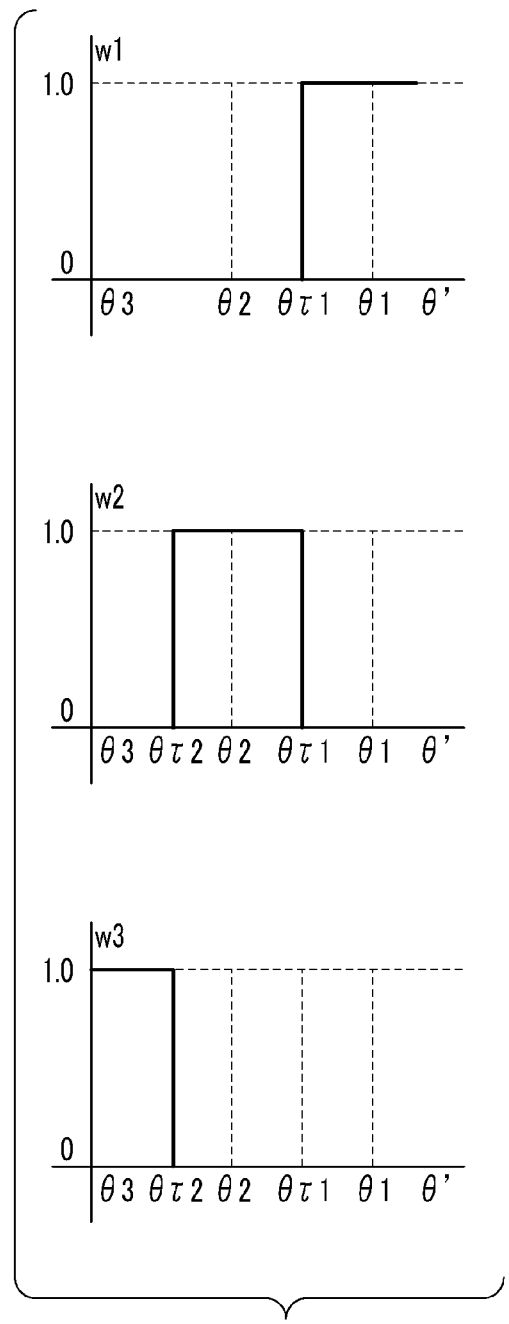
FIG.16A FIG.16B

IMAGE-PROCESSING APPARATUS AND IMAGE-PROCESSING METHOD FOR GENERATING A VIRTUAL ANGLE OF VIEW

BACKGROUND OF THE INVENTION

1. Field of the Invention

The present invention relates to an image-processing apparatus, and an image-processing method. Specifically, the present invention relates to an image-processing apparatus, and an image-processing method which use a plurality of pieces of captured image data of different angles of view to generate image data of a different angle of view.

2. Description of the Related Art

Heretofore, there has been known a technique which realizes zoom through image processing (digital zoom) by enlarging a desired area of a captured image. This method has a problem in that, as the zoom magnification increases, the pixel-enlargement magnification increases and the perceived resolution is gradually deteriorated. To this end, there has been known a technique in which zoom based on image processing is performed without deteriorating the perceived resolution by using a plurality of cameras of different angles of view (e.g. Japanese Patent No. 4341019). Japanese Patent No. 4341019 uses an image-capturing apparatus including a camera of a wide angle of view and a camera of a narrow angle of view. In a case where the zoom magnification is low, the digital zoom process is performed by using the camera of the wide angle of view. In a case where the zoom magnification exceeds a predetermined value, the camera in use is switched, and the digital zoom process is performed using the camera of the narrow angle of view.

However, Japanese Patent No. 4341019 has a problem in that the perceived resolution greatly changes when the camera in use is switched.

SUMMARY OF THE INVENTION

In view of this, the present invention realizes digital zoom in which the perceived resolution does not deteriorate and also the perceived resolution changes smoothly.

An image-processing apparatus according to the present invention includes an obtaining unit configured to obtain first image data having a first angle of view and second image data having a second angle of view smaller than the first angle of view, and a generating unit configured to generate third image data by performing weighted combination of the first image data and the second image data, the third image data having a third angle of view determined according to a user command and being smaller than the first angle of view but larger than the second angle of view, the generating unit determines weights on the first image data and second image data in the weighted combination such that the closer the third angle of view is to the second angle of view, the larger is the weight on the second image data relative to the weight on the first image data, and the generating unit performs the weighted combination by using the determined weights.

The present invention can realize smooth digital zoom without deteriorating the perceived resolution.

Further features of the present invention will become apparent from the following description of exemplary embodiments (with reference to the attached drawings).

BRIEF DESCRIPTION OF THE DRAWINGS

FIG. 2 is a block diagram showing an example of the internal configuration of the multiple-lens image-capturing apparatus;

FIG. 9 is a diagram showing the correspondence between the captured image 1 and a virtual-angle-of-view image according to Embodiment 1 of the present invention;

FIGS. 16A and 16B are sets of graphs each showing the relationship between a virtual angle of view and weights in Embodiment 5 of the present invention;

DESCRIPTION OF THE EMBODIMENTS

Hereinbelow, embodiments of the invention will be described in detail with reference to the drawings. Note that the following embodiments are mere illustration of examples and are not intended to limit the scope of the present invention.

Embodiment 1

In this embodiment, virtual-angle-of-view image data corresponding to a virtual angle of view selected by the user is generated based on two pieces of captured image data of different angles of view and on the virtual angle of view. In this process, virtual-angle-of-view image data of a small zoom magnification can be obtained by setting the virtual angle of view to a large value, and virtual-angle-of-view image data of a large zoom magnification can be obtained by setting the virtual angle of view to a small value. In other words, by changing the virtual angle of view, the user can change the zoom magnification of the virtual-angle-of-view image data. This embodiment can be utilized as a process for generating preview image data at the time of image capture or as a process for generating image data zoomed with a given magnification after image capture.

Figure 1A:
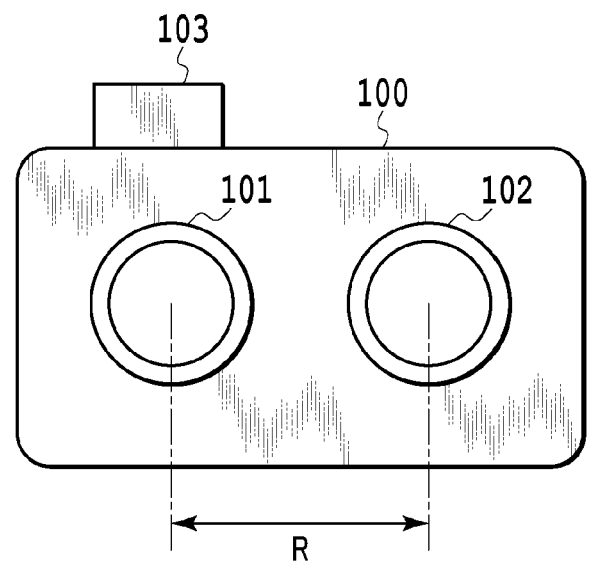
FIGS. 1A and 1B are diagrams showing an example of a multiple-lens image-capturing apparatus including a plurality of image-capturing units according to Embodiment 1 of the present invention.
Figure 1B:
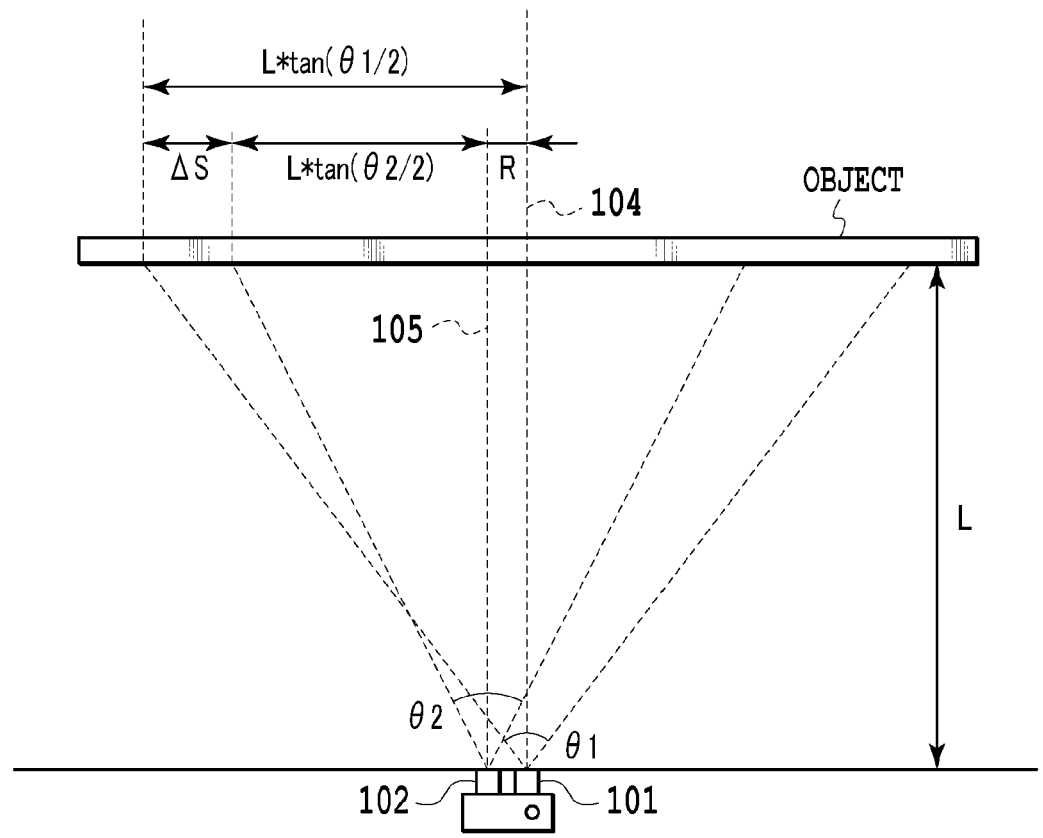

FIGS. 1A and 1B are diagrams showing an example of a multiple-point-of-view image-capturing apparatus according to a multiple-lens system including a plurality of image-capturing units. As shown in FIG. 1A, an image-capturing apparatus 100 includes two image-capturing units 101, 102 configured to obtain color image data, and an image-capturing button 103. As shown in FIG. 1B, the image-capturing unit 101 and the image-capturing unit 102 are disposed in such a way as to have their respective optical axes 104, 105 in parallel with each other. In this embodiment, the horizontal gap between the image-capturing unit 101 and the image-capturing unit 102 is R, the vertical gap therebetween is T, the horizontal angle of view of the image-capturing unit 101 is $\theta 1$, the vertical angle of view thereof is $\phi 1$, the horizontal angle of view of the image-capturing unit 102 is $\theta 2$, and the vertical angle of view thereof is $\phi 2$. Note that the horizontal angles of view satisfy $\theta 1 > \theta 2$, and the vertical angles of view satisfy $\phi 1 > \phi 2$. Thus, the image-capturing unit 101 has wider angles of view than the image-capturing unit 102. As the user presses the image-capturing button 103, the image-capturing units 101, 102 receive light at their sensors (image-capturing devices) as optical information on an object. The optical signals thus received are A/D converted, and a plurality of pieces of digital data (captured image data) are obtained simultaneously. A distance L from the image-capturing apparatus 100 to the object calculated based on the focus settings at the time of the image capture and the like is attached to each piece of the captured image data as tag information.

With the multiple-lens image-capturing apparatus configured as above, it is possible to obtain pieces of captured image data on the same object captured from a plurality of points of view. Note that although the number of image-capturing units is two here, the number of image-capturing units is not limited to two. This embodiment is applicable regardless of the number as long as the image-capturing apparatus includes a plurality of image-capturing units.

FIG. 2 is a block diagram showing the internal configuration of the image-capturing apparatus 100. A central processing unit (CPU) 201 is configured to integrally control units to be described below. A RAM 202 functions as the main memory, work area, and the like of the CPU 201. A ROM 203 is configured to store a control program to be executed by the CPU 201 and the like.

A bus 204 functions as a transfer path for various kinds of data. For example, captured image data obtained by the image-capturing units 101, 102 are sent to predetermined processing units through this bus 204. An operation unit 205 is configured to receive the user's commands. Specifically, the operation unit 205 includes buttons, a mode dial, and the like and is capable of receiving image-capturing commands and zooming commands. A displaying unit 206 is configured to display captured images and letters. A liquid crystal display is used, for example. The displaying unit 206 may also have a touchscreen function, in which case user commands such as image-capturing commands and zooming commands through the touchscreen can be handled as inputs of the operation unit 205.

A display controlling unit 207 is configured to control display of images and letters to be displayed on the displaying unit 206. An image-capture controlling unit 208 is configured to control each image-capturing unit based on commands from the CPU 201 such as focusing the lens, opening/closing the shutter, and adjusting the diaphragm. A digital-signal processing unit 209 is configured to perform various processes such as white balancing, gamma correction, and noise reduction on captured image data received through the bus 204.

An encoding unit 210 is configured to perform a process for converting captured image data into a file format such as JPEG or MPEG. An external-memory controlling unit 211 is an interface for connecting the image-capturing apparatus 100 to an external memory 213 (e.g. PC, hard disk drive, memory card, CF card, SD card, and USB memory). An image-processing unit 212 is configured to perform image processing such as image combination by using pieces of captured image data obtained by the image-capturing units 101, 102 or by using pieces of captured image data outputted from the digital-signal processing unit 209. For example, the image-processing unit 212 generates virtual-angle-of-view image data corresponding to a virtual angle of view set by the user's zooming command, by using a plurality of pieces of image data of different angles of view and the virtual angle of view.

Note that there are other constituent components of the image-capturing apparatus besides the above. However, since they are not key parts of this embodiment, their description is omitted here.

Figure 3:
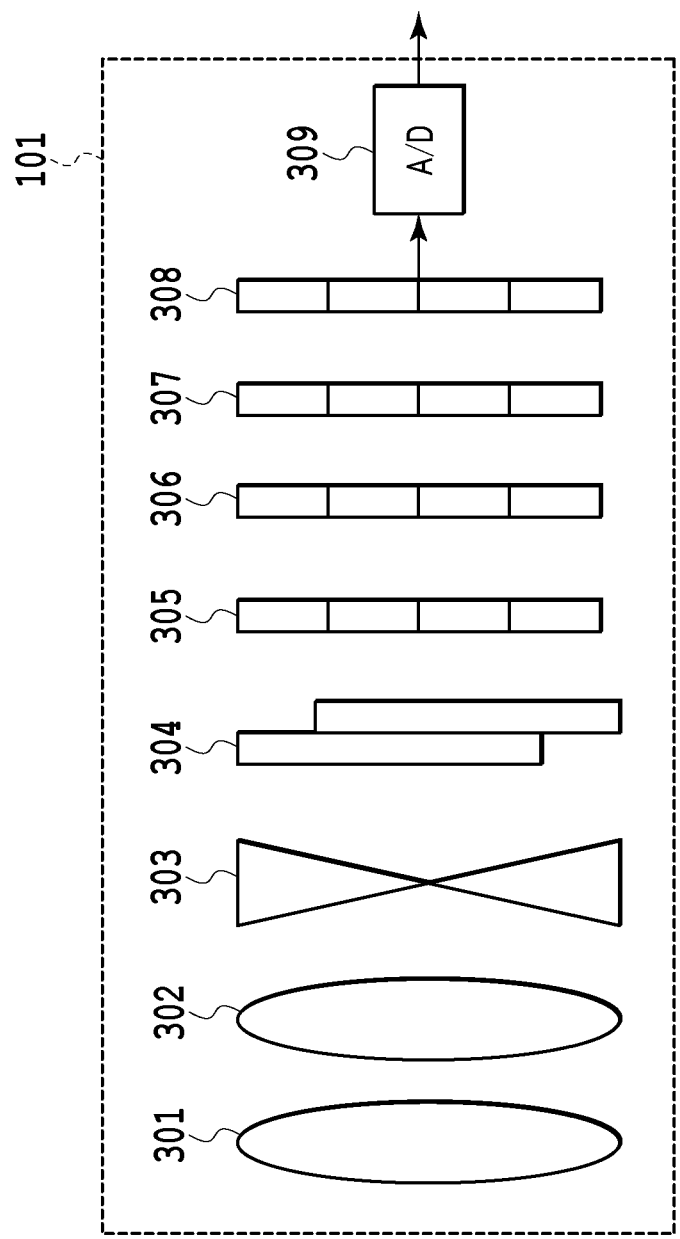
FIG. 3 is a diagram showing an example of the internal configuration of each image-capturing unit.

FIG. 3 is a diagram showing the internal configuration of the image-capturing unit 101. The image-capturing unit 101 includes lenses 301, 302, a diaphragm 303, a shutter 304, an optical low-pass filter 305, an IR-cut filter 306, a color filter 307, a sensor 308, and an A/D converter 309. The lenses 301, 302 are a focus lens 301 and a blur-correcting lens 302, respectively. The sensor 308 is a sensor such for example as a CMOS or CCD sensor and is configured to detect the amount of light from an object focused thereon by the above lenses. The amount of light thus detected is outputted as analog values from the sensor 308, converted into digital values by the A/D converter 309, and outputted as digital data to the bus 204. Note that the image-capturing unit 102 can have a similar configuration as well.

Figure 4:
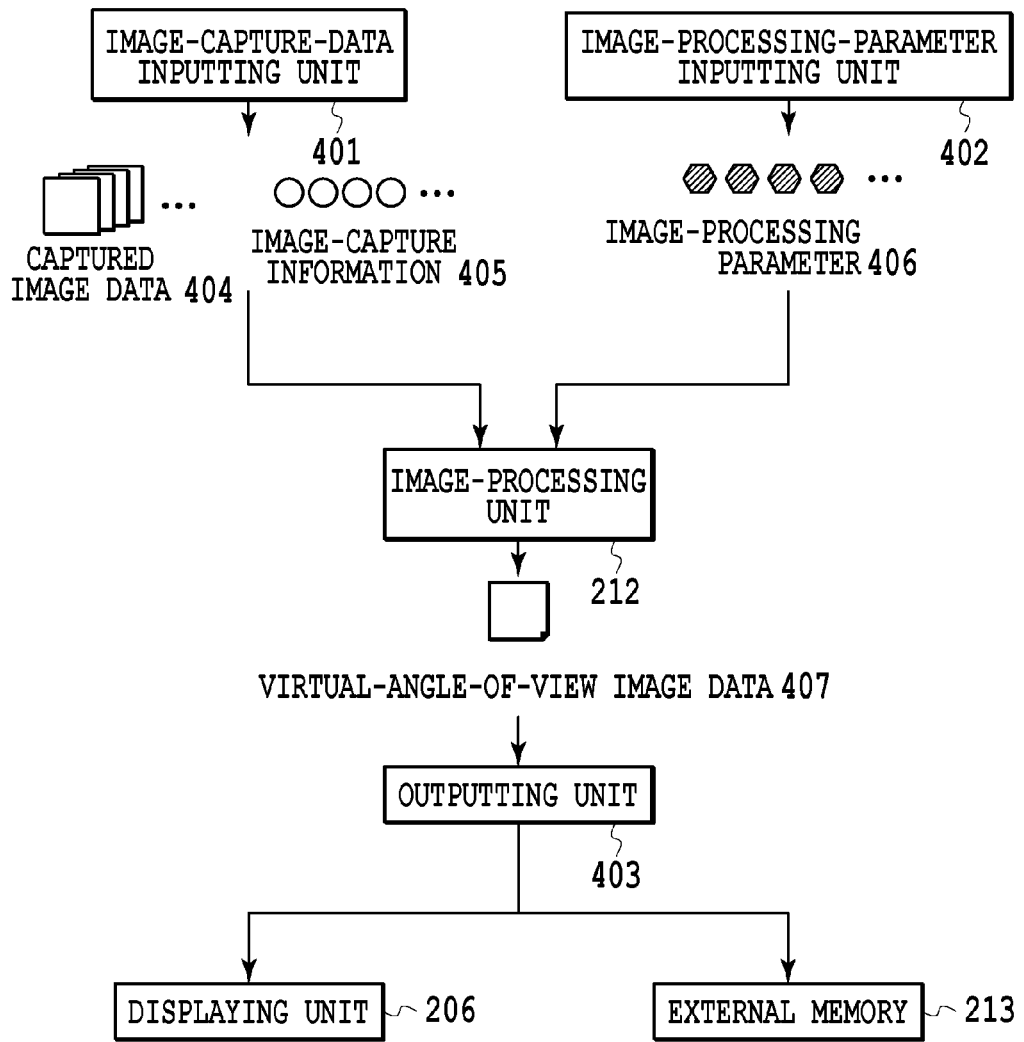
FIG. 4 is a diagram showing a schematic functional configuration according to Embodiment 1 of the present invention.

Next, a schematic functional configuration used in a case of performing a series of processes according to this embodiment will be described with reference to FIG. 4. An image-capture-data inputting unit 401 as a functional part of the CPU 201 obtains a plurality of pieces of captured image data 404 captured by the image-capturing units 101, 102 from the image-capturing units 101, 102. Alternatively, the image-capture-data inputting unit 401 may, for example, obtain pieces of captured image data 404 which are stored in advance in the RAM 202, the external memory 213, or the like. Moreover, the image-capture-data inputting unit 401 obtains image-capture information 405 including the angles of view θ1, φ1 of the image-capturing unit 101, the angles of view θ2, φ2 of the image-capturing unit 102, and the gap R between the image-capturing unit 101 and the image-capturing unit 102, from a storage device such as the ROM 203 or the external memory 213.

An image-processing-parameter inputting unit 402 as a functional part of the CPU 201 obtains an image-processing parameter 406 including a virtual angle of view θ' from the storage device such as the ROM 203 or the external memory 213. Note that the virtual angle of view θ' is determined according to the user's zooming command received through the operation unit 205 or the like, and is stored in the storage device. The image-processing unit 212 generates virtual-angle-of-view image data 407 corresponding to the virtual angle of view θ', which is included in the image-processing parameter 406, based on the plurality of pieces of captured image data 404, the image-capture information 405, and the virtual angle of view θ'. Lastly, an outputting unit 403 as a functional part of the CPU 201 outputs the virtual-angle-of-view image data 407 to the displaying unit 206 and the external memory 213.

Figure 5:
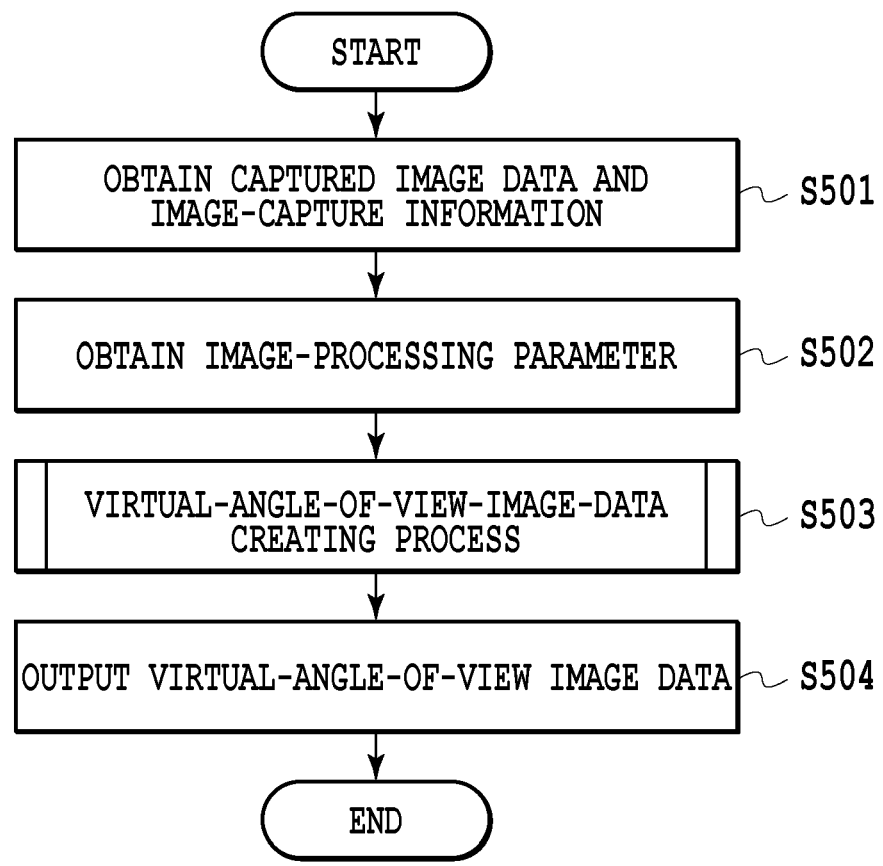
FIG. 5 is a flowchart showing the operations in an entire process according to Embodiment 1 of the present invention.

FIG. 5 is a flowchart showing the sequence of operations in a series of processes performed in an image-processing apparatus of this embodiment. Specifically, the processes are executed by loading a program in which the sequence shown in the flowchart in FIG. 5 is described into the RAM 202 from the ROM 203 and then by causing the CPU 201 to execute this program.

Each process shown in FIG. 5 will be described below. First, in an image-data obtaining process in step S501, the image-capture-data inputting unit 401 obtains a plurality of pieces of captured image data 404 captured by the image-capturing units 101, 102 from the image-capturing units 101, 102. The captured image data 404 thus obtained is stored into the RAM 202 or the like. Alternatively, the captured image data 404 may be held in advance in the external memory 213 or the like and then obtained by the image-capture-data inputting unit 401. The image-capture-data inputting unit 401 also obtains the image-capture information 405 including the angles of view θ1, φ1 of the image-capturing unit 101, the angles of view θ2, φ2 of the image-capturing unit 102, and the gap R between the image-capturing unit 101 and the image-capturing unit 102, from the storage device such as the ROM 203 or the external memory 213.

Then, in an image-processing-parameter obtaining process (virtual-angle-of-view obtaining process) in step S502, the image-processing-parameter inputting unit 402 obtains the image-processing parameter 406 including the virtual angle of view θ' from the storage device such as the ROM 203 or the external memory 213.

Then, in step S503, the image-processing unit 212 generates virtual-angle-of-view image data 407 by using the captured image data 404 and the image-capture information 405 stored in step S501 and the image-processing parameter 406 obtained in step S502. The virtual-angle-of-view image data 407 thus generated is stored into the RAM 202 or the like. The process in step S503 will be described later in detail.

Lastly, in step S504, the outputting unit 405 outputs the virtual-angle-of-view image data 407 stored in step S503 to the displaying unit 206 and the external memory 213. By outputting the virtual-angle-of-view image data 407 to the displaying unit 206, an image represented by the virtual-angle-of-view image data 407 can be displayed. By outputting the virtual-angle-of-view image data 407 to the external memory 213, the virtual-angle-of-view image data 407 can be stored in the external memory.

<Virtual-Angle-of-View-Image-Data Generating Process>

Figure 6:
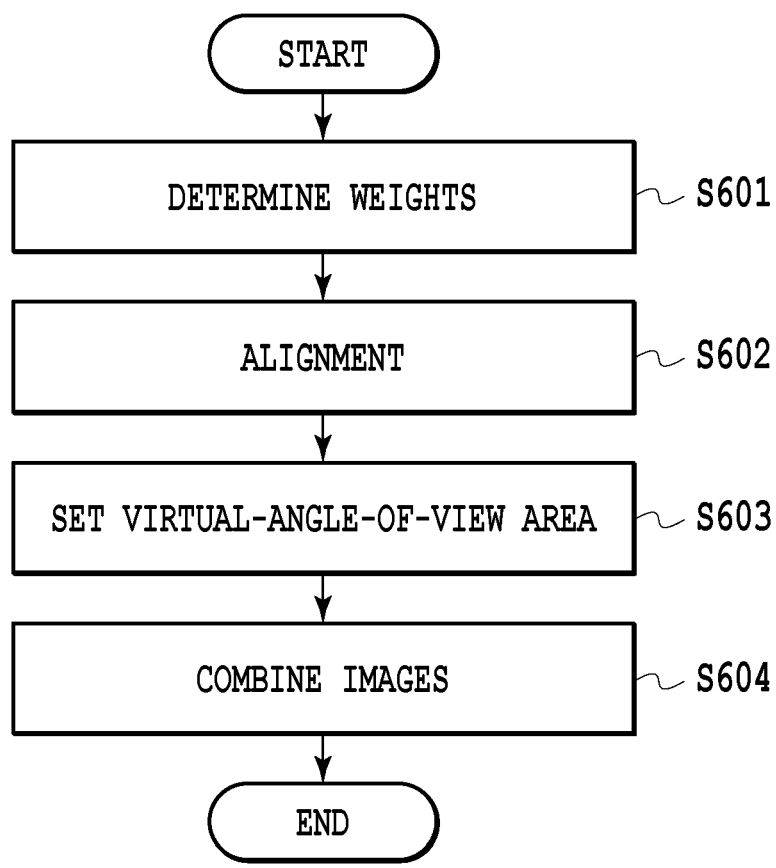
FIG. 6 is a flowchart showing the operations in a virtual-angle-of-view-image generating process according to Embodiment 1 of the present invention.

In this section, the virtual-angle-of-view-image-data generating process performed in step S503 will be described. In the virtual-angle-of-view-image-data generating process, the virtual-angle-of-view image data 407 is generated by using the captured image data 404 and the image-capture information 405 obtained in step S501 and the image-processing parameter 406 obtained in step S502. Details of the virtual-angle-of-view-image-data generating process will be described below with reference to a flowchart shown in FIG. 6.

Figure 7A:
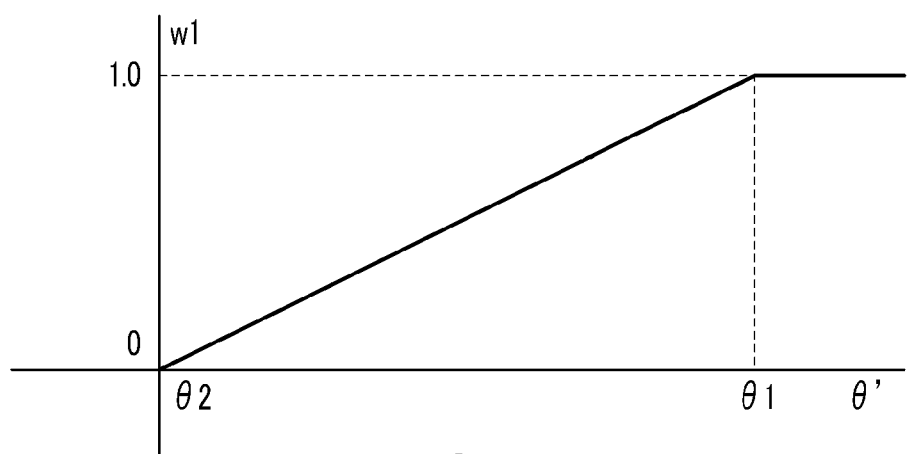
FIGS. 7A to 7C are graphs each showing the relationship between a virtual angle of view and weights according to Embodiment 1 of the present invention.

First, in step S601, the image-processing unit 212 determines weights based on the angle of view θ1 of the image-capturing unit 101 and the angle of view θ2 of the image-capturing unit 102 included in the image-capture information 405 and the virtual angle of view θ' included in the image-processing parameter 406. The weights thus determined are weights to be applied to the pieces of captured image data 404 for the virtual-angle-of-view image data 407 to be generated. In the following, captured images represented by the pieces of captured image data captured by the image-capturing units 101, 102 will be denoted by I1, I2, respectively. As mentioned earlier, the image-capturing unit 101 has wider angles of view than the image-capturing unit 102. Thus, the captured image I1 has wider angles of view than the captured image I2. Moreover, the weights to be applied to the captured images I1, I2 will be denoted by w1, w2, respectively. FIG. 7A shows an example of the relationship between the virtual angle of view θ' and the weights w1, w2. In FIG. 7A, the weights w1, w2 are determined such that the larger the value of the virtual angle of view θ', the larger the value of the weight w1. Specifically, the weights w1, w2 are described by the following equations.

$$w1 = \frac{\theta' - \theta2}{\theta1 - \theta2} \quad (1)$$
$$w2 = 1 - w1$$

The weights w1, w2 thus determined are stored into a storage device such as the RAM 202.

Then, in step S602, the image-processing unit 212 aligns the captured image I1 and the captured image I2. Specifically, the pixels (x,y) of the captured image I1 and the pixels (x',y') of the captured image I2 are associated with each other by using affine parameters a1 to a6 such that the object in the captured image I1 and the object in the captured image I2 overlap each other. The relationships between the pixels (x,y) and the pixels (x',y') and the affine parameters a1 to a6 are described by the following equations.

$$x'=a1x+a2y+a3$$
$$y'=a4x+a5y+a6 \quad (2)$$

An example of the method of determining the affine parameters a1 to a6 will be described below. Here, the affine parameters a1 to a6 are determined according to the following equations based on the angles of view θ1, φ1 of the image-capturing unit 101, the angles of view θ2, φ2 of the image-capturing unit 102, the distance L to the object, and the gap R between the image-capturing units.

$$a1 = \frac{\tan(\theta 2/2)}{\tan(\theta 1/2)} \quad (3)$$

$$a3 = s1$$

$$a5 = \frac{\tan(\phi 2/2)}{\tan(\phi 1/2)}$$

$$a6 = t1$$

$$a2 = a4 = 0$$

Figure 8:
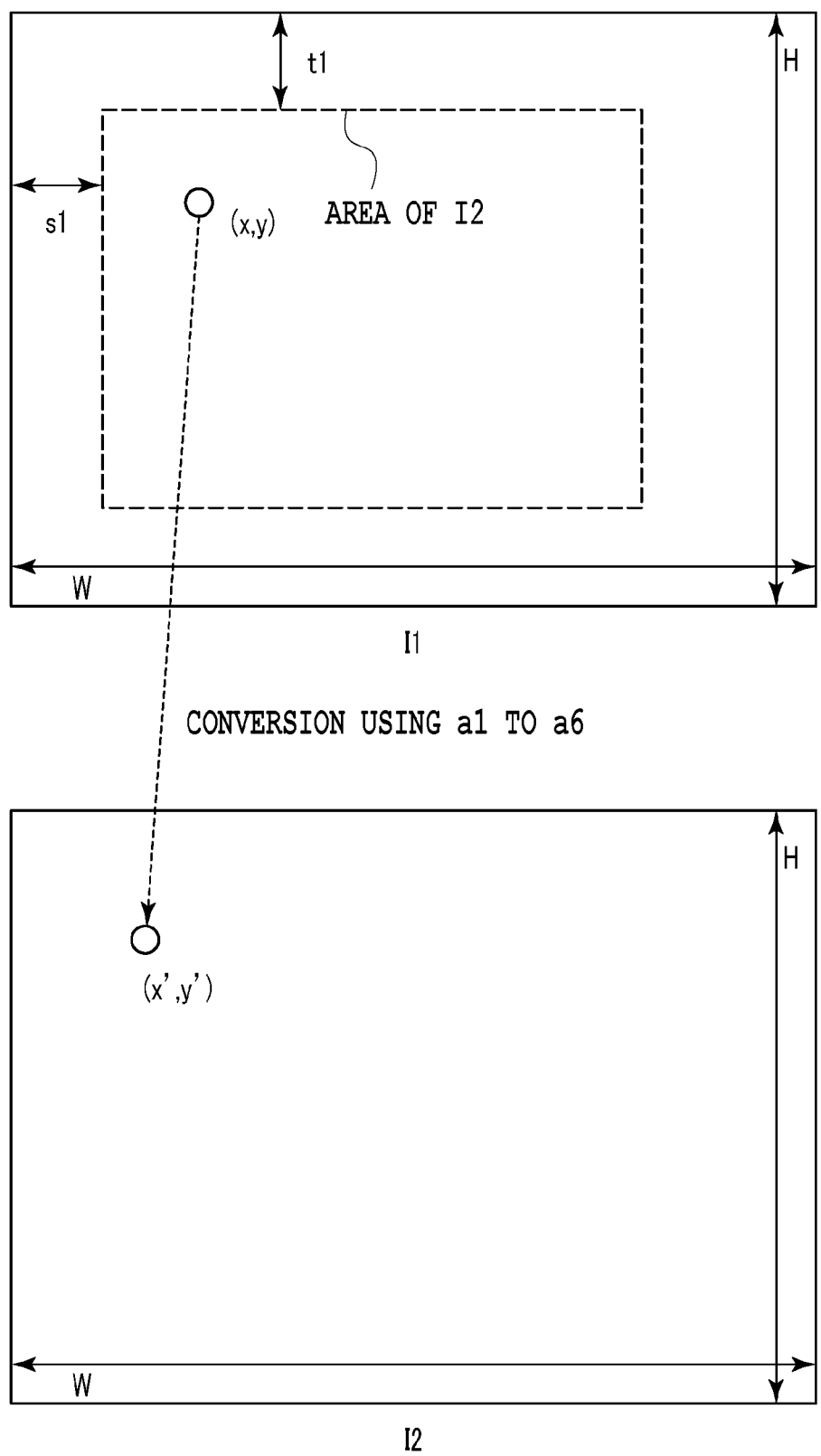
FIG. 8 is a diagram showing the correspondence between a captured image 1 and a captured image 2 according to Embodiment 1 of the present invention.

Here, as shown in FIG. 8, s1, t1 correspond respectively to the distances from the area of the captured image I2 in the captured image I1 to ends of the captured image I1 after the alignment, and can be found by the following equations. See also FIG. 1B.

$$s1 = \frac{W}{2L\tan(\theta 1/2)} \Delta S \quad (4)$$

$$t1 = \frac{H}{2L\tan(\phi 1/2)} \Delta T$$

Here, W, H denote the width and height of the captured image I1, respectively. Moreover, ΔS, ΔT denote the lengths of cut portions the object and can be found by the following equations.

$$\Delta S = L\left(\tan\left(\frac{\theta 1}{2}\right) - \tan\left(\frac{\theta 2}{2}\right)\right) - R \quad (5)$$

$$\Delta T = L\left(\tan\left(\frac{\phi 1}{2}\right) - \tan\left(\frac{\phi 2}{2}\right)\right) - T$$

The affine parameters a1 to a6 determined as described above are stored into the storage device such as the RAM 202.

Then, in step S603, the image-processing unit 212 sets a virtual-angle-of-view area in the captured image I1 based on the virtual angle of view θ' included in the image-processing parameter 406. Specifically, as shown in FIG. 9, the image-processing unit 212 determines affine parameters b1 to b6 which indicate the relationship between the pixels (x, y) of the captured image I1 and the pixels (x", y") of the virtual-angle-of-view image data 407. Equations therefor are shown below.

$$x = b1x'' + b2y'' + b3$$

$$y = b4x'' + b5y'' + b6 \quad (6)$$

An example of the method of determining the affine parameters b1 to b6 will be described below. Here, the affine parameters b1 to b6 are determined according to the following equations based on the angles of view of the captured image I1, the angles of view of the virtual-angle-of-view image, and the size of the captured image I1.

$$b1 = \frac{W'}{W} \quad (7)$$

$$b3 = s2$$

-continued $$b5 = \frac{H'}{H}$$

$$b6 = t2$$

$$b2 = b4 = 0$$

Here, W', H' denote the width and height of the virtual-angle-of-view area in the captured image I1, respectively. Moreover, s2, t2 correspond respectively to the distances from the virtual-angle-of-view area shown in FIG. 9 to the ends of the captured image I1, and can be found by the following equations, for example.

$$s2 = \frac{W}{2}\left(1 - \frac{\tan(\theta'/2)}{\tan(\theta 1/2)}\right) \quad (8)$$

$$t2 = \frac{H}{2}\left(1 - \frac{\tan(\phi'/2)}{\tan(\phi 1/2)}\right)$$

The affine parameters b1 to b6 determined as described above are stored into the storage device such as the RAM 202.

Lastly, in step S604, the image-processing unit 212 generates the virtual-angle-of-view image data 407 from the captured image data 404. In step S604, the virtual-angle-of-view image data 407 is generated by using the weights w1, w2 stored in step S601, the affine parameters a1 to a6 stored in step S602, and the affine parameters b1 to b6 stored in step S603. Specifically, the virtual-angle-of-view image data 407 is generated by finding weighted means of the captured images I1, I2 according to the following equations.

$$I''(x'', y'') = \begin{cases} (1 - w2)I1(x, y) + & \text{if } (x', y') \text{ is included} \\ w2I2(x', y') & \text{in caputed image } I2 \\ I1(x, y) & \text{if } (x', y') \text{ is not included} \\ & \text{in captured image } I2 \end{cases} \quad (9)$$

Figure 10:
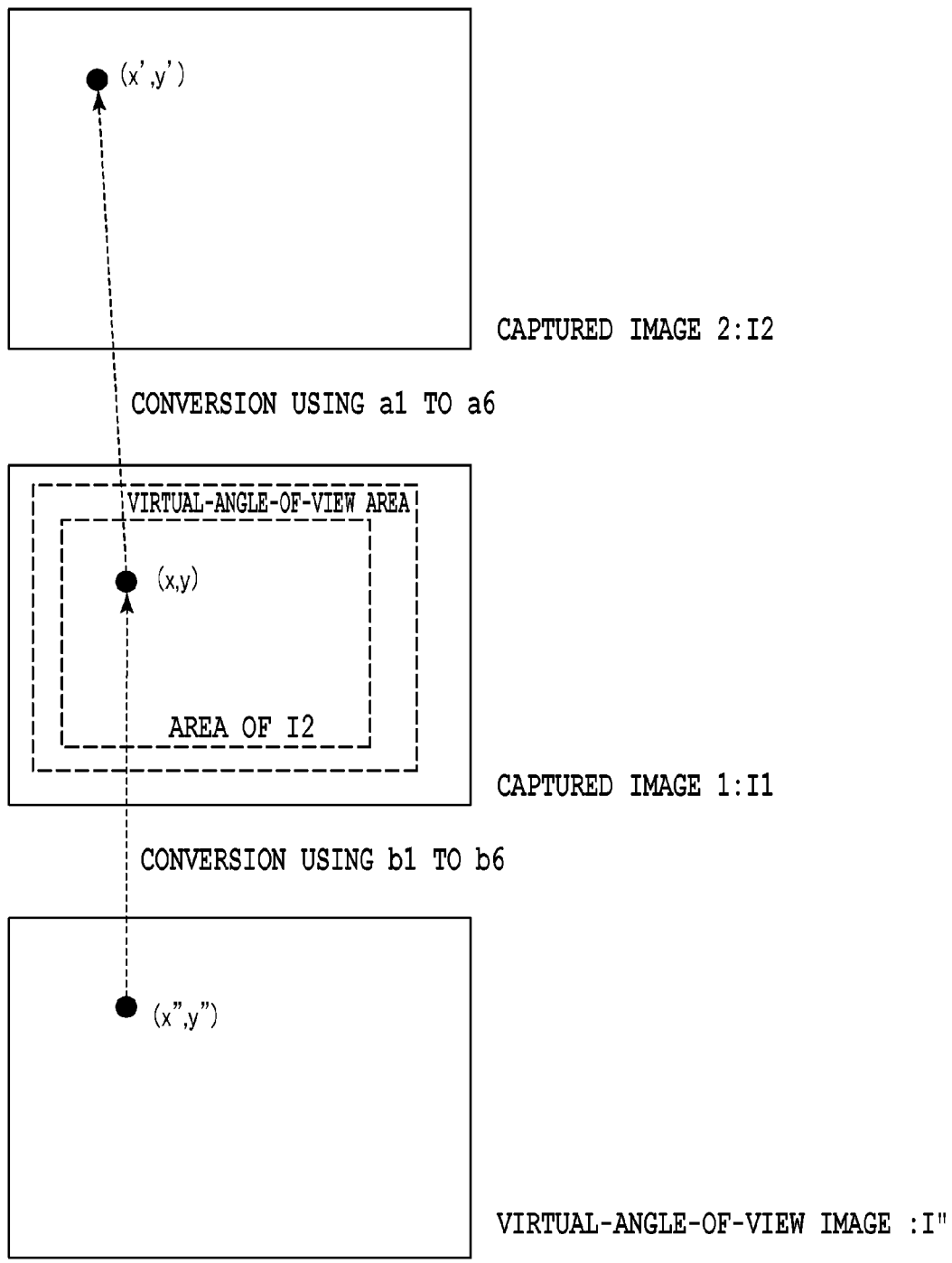
FIG. 10 is a diagram showing the correspondence between the captured image 1 and the captured image 2 and the virtual-angle-of-view image after an image-combining process.

Here, I" is the virtual-angle-of-view image represented by the virtual-angle-of-view image data 407. FIG. 10 is a diagram showing the correspondence between the captured image I1 and the captured image I2 and the virtual-angle-of-view image I" after the image-combining process. The pixels (x",y") of the virtual-angle-of-view image I" are determined from the pixels (x,y) of the captured image I1 and the affine parameters b1 to b6. Moreover, the pixels (x',y') of the captured image I2 corresponding to the pixels (x",y") of the virtual-angle-of-view image I" are determined from the pixels (x,y) of the captured image I1 and the affine parameters a1 to a6. The virtual-angle-of-view image data 407 representing the virtual-angle-of-view image I" is generated from the captured images I1, I2 by using the above relationships. The virtual-angle-of-view image data 407 thus generated is stored into the storage device such as the RAM 202. By the above step, the virtual-angle-of-view-image generating process is finished.

By performing the processes and control described above, virtual-angle-of-view image data corresponding to a given virtual angle of view can be generated. By generating and displaying virtual-angle-of-view image data according to the user's zooming command, digital zoom with smooth change in perceived resolution can be realized.

Figure 7B:
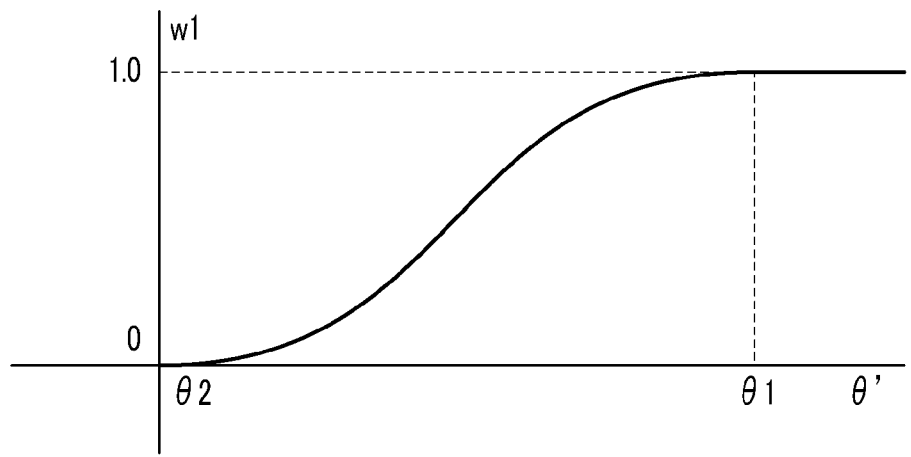

In this embodiment, the weights w1, w2 are linearly changed according to the value of the virtual angle of view θ' in such a way as to follow the line in FIG. 7A. Note, however, that the relationship between the weights and the virtual angle of view is not limited to this case. For example, the weights w1, w2 may be changed according to the value of the virtual angle of view θ' as shown in FIG. 7B. Specifically, such changes are described by the following equations.

$$w1 = \frac{1}{1 + e^{-\alpha(\theta' - \beta)}} \quad (10)$$
$$\beta = \frac{\theta1 - \theta2}{2}$$
$$w2 = 1 - w1$$

By using non-linear weighting as shown in FIG. 7B, the perceived resolution can be changed more smoothly in response to the user's zooming command. Alternatively, the weights w1, w2 may be switched between 0 and 1 according to the value of the virtual angle of view θ' as shown in FIG. 7C.

$$w1 = \begin{cases} 0 & (\theta' < \theta t) \\ 1 & (\theta t \le \theta') \end{cases} \quad (11)$$
$$w2 = 1 - w1$$

Figure 7C:
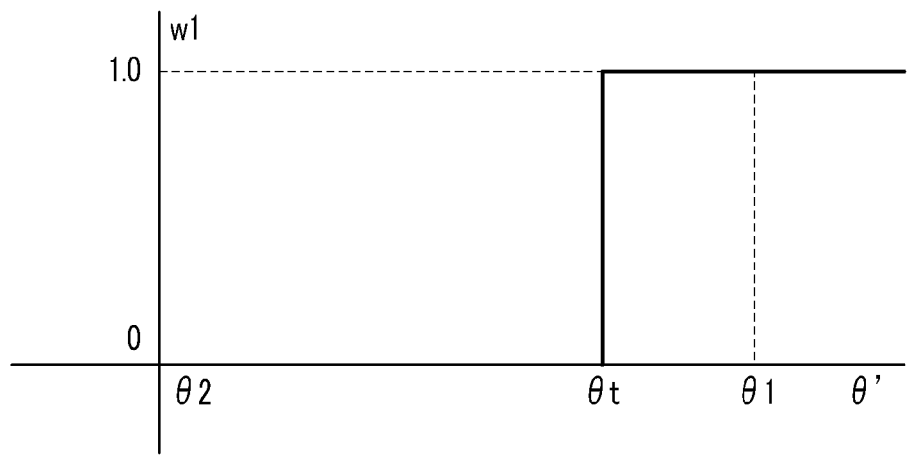

By using weighting as shown in FIG. 7C, the captured image I2 with higher perceived resolution, which is a part of the captured image data 404, can be used preferentially. Accordingly, the perceived resolution of the virtual-angle-of-view image data 407 can be improved.

Moreover, although the optical axis 104 and the optical axis 105 are parallel with each other in this embodiment, this embodiment is applicable even without exact parallelism therebetween. In this case, however, the method of determining the affine parameters a1 to a6 needs to be changed. For example, a motion vector may be determined for each block of a captured image 1 and of a captured image 2, and the affine parameters a1 to a6 may be determined based on the motion vectors by using the method of least squares or the like. Alternatively, instead of affine parameters, projective transform parameters may be found based on the motion vectors to associate the captured image I1 and the captured image I2, for example.

Figure 11A:
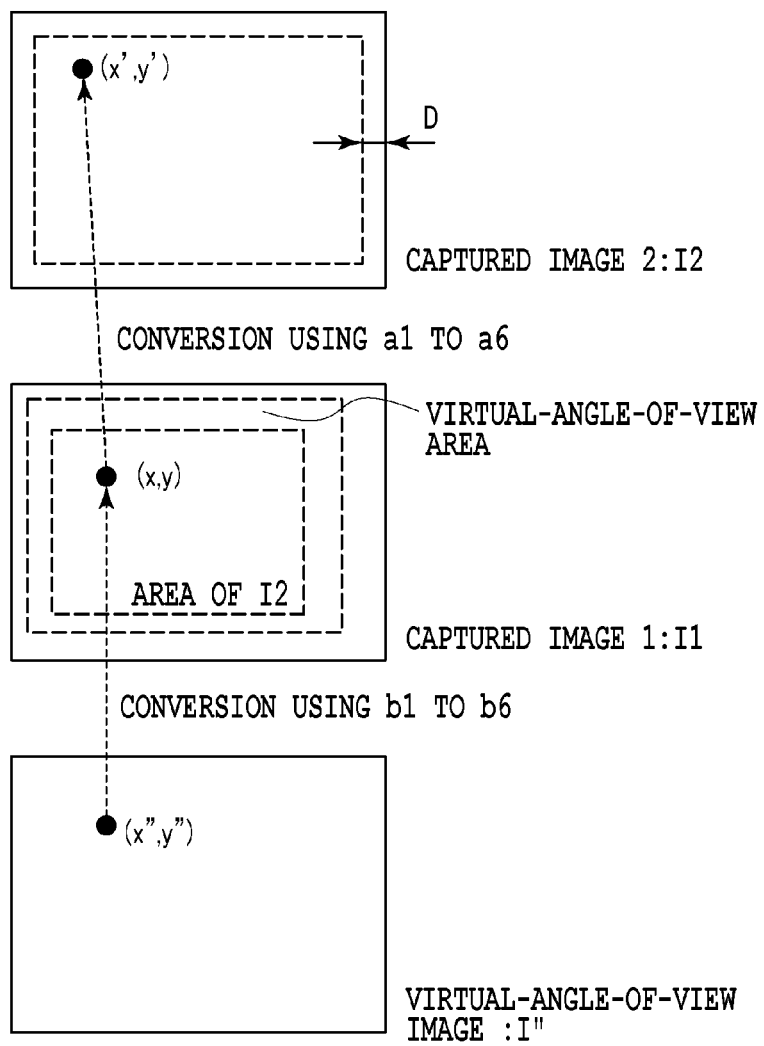
FIGS. 11A and 11B are a diagram and a graph showing the correspondence between the captured image 1 and the captured image 2 and the virtual-angle-of-view image in a case where a blending process is performed during the image-combining process.

Still alternatively, as shown in FIG. 11A, an area separated from the end of the captured image I2 by a distance of D or shorter may be additionally set as an area for blending, and a blending process may be performed to make the boundary with the captured image I1 unnoticeable. Specifically, weighted means of the captured images I1, I2 may be found according to the following equations to generate the virtual-angle-of-view image data 407.

$$I''(x'', y'') = \begin{cases} (1 - w2w3)I1(x, y) + & \text{if}(x', y') \text{ is included in} \\ w2w3 I2(x', y') & \text{captured image } I2 \\ I1(x, y) & \text{if}(x', y') \text{ is not included in} \\ & \text{captured image } I2 \end{cases} \quad (12)$$

Figure 11B:
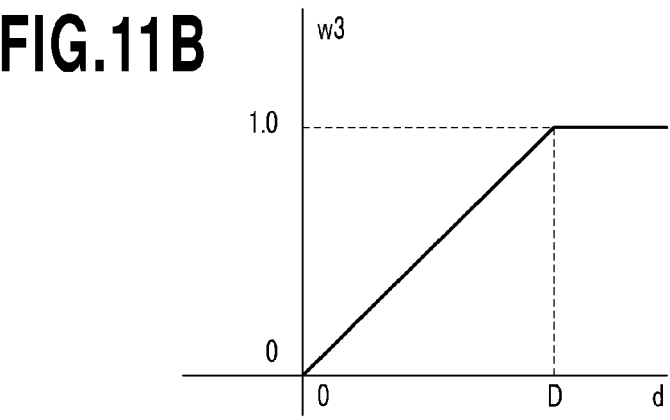

Here, as shown in FIG. 11B, w3 is a weight value determined by a distance d from the pixel (x',y') of the captured image I2 to the end of the captured image I2 and is set such that the longer the distance d, the larger the weight value w3. By combining the captured images I1, I2 according to the above equations, the captured images I1, I2 can be combined such that their boundary portion is made smooth.

Embodiment 2

In Embodiment 1, the virtual-angle-of-view image data 407 is generated by using any one of the weighting methods shown in FIGS. 7A to 7C. In Embodiment 2, the weighting method is switched according to a mode selected by the user. In this way, virtual-angle-of-view image data 407 based on a given image-capturing mode can be generated.

In Embodiment 2, the image-capture mode can be switched between a noise-reduction priority mode and a resolution priority mode. The mode can be switched by a user operation obtained from an operation unit 205. An example of weights in each mode will be described below. In the noise-reduction priority mode, the weights shown in FIG. 7A or 7B are used to perform image combination. In the resolution priority mode, the weights shown in FIG. 7C are used to perform image combination. Thus, in the noise-reduction priority mode, a captured image I1 and a captured image I2 are averaged, so that a noise reduction effect can be achieved. Moreover, in the resolution priority mode, θt is set to be equal to θ1 (θt=θ1), so that the captured image I2 which has higher perceived resolution than the captured image I1 can be preferentially used within a range of θ1≤θ'≤θ2. In this way, the perceived resolution of the virtual-angle-of-view image data 407 can be improved.

By performing the process described above, virtual-angle-of-view image data 407 based on a given image-capturing mode can be generated.

Embodiment 3

In Embodiment 1 and Embodiment 2, the virtual-angle-of-view image data 407 is generated by using a set of weights w1, w2 for the entire image. In Embodiment 3, the weights w1, w2 are corrected based on the difference between the image data on a captured image I1 and a captured image I2 which is calculated for each divided area, and the virtual-angle-of-view image data 407 is generated by using sets of weights differing from one area to another. In this way, it is possible to suppress deterioration in perceived resolution resulting from alignment errors.

Specifically, first, a virtual-angle-of-view image represented by the virtual-angle-of-view image data 407 is divided into a plurality of rectangular areas. Then, for each of these rectangular areas, the sum of the absolute values of the differences between the pixels (x,y) of the captured image I1 and the corresponding pixels (x',y') of the captured image I2 is calculated. Thereafter, a correction process is performed on the weights w1, w2 based on the difference thus calculated. Specifically, in a case of an area with a large difference, the value of the weight w2 is corrected to be large while the value of the weight w1 is corrected to be small. In this way, in each area with a large difference, the perceived resolution becomes substantially equal to that of the captured image I2. Accordingly, it is possible to suppress deterioration in the perceived resolution of the virtual-angle-of-view image resulting from alignment errors.

Meanwhile, although the value of the weight w2 is corrected to be large and the value of the weight w1 is corrected to be small in this embodiment, the value of the weight w1 may be corrected to be large and the value of the weight w2 may be corrected to be small instead. In this case, in each area with a large difference, the perceived resolution becomes substantially equal to that of the captured image I1, but it is still possible to suppress deterioration in the perceived resolution of the virtual-angle-of-view image resulting from alignment errors.

Note that although the weights are set based on the sum of the absolute values of the differences between the pixels (x, y) of the captured image I1 and the pixels (x', y') of the captured image I2 in this embodiment, the method of determining the weights is not limited to this case. This embodiment is applicable as long as there is a value indicating the difference between the captured image I1 and the captured image I2.

By performing the processes described above, it is possible to suppress deterioration in perceived resolution resulting from alignment errors.

Embodiment 4

In Embodiments 1 to 3, the example is described in which mainly a flat-surface object is the image-capturing target, and the virtual-angle-of-view image data 407 is generated by calculating weighted means of pieces of captured image data of different angles of view captured from different positions. In Embodiment 4, virtual-point-of-view image data of an angle of view θ2 corresponding to the same point of view as captured image data of the angle of view θ1 is generated from a plurality of pieces of captured image data of an angle of view θ2. Then, virtual-angle-of-view image data is generated by adding the captured image data of the angle of view θ1 and the generated virtual-point-of-view image data of the angle of view θ2. In this way, good virtual-angle-of-view image data can be generated even from an object that has a depth.

Figure 12A:
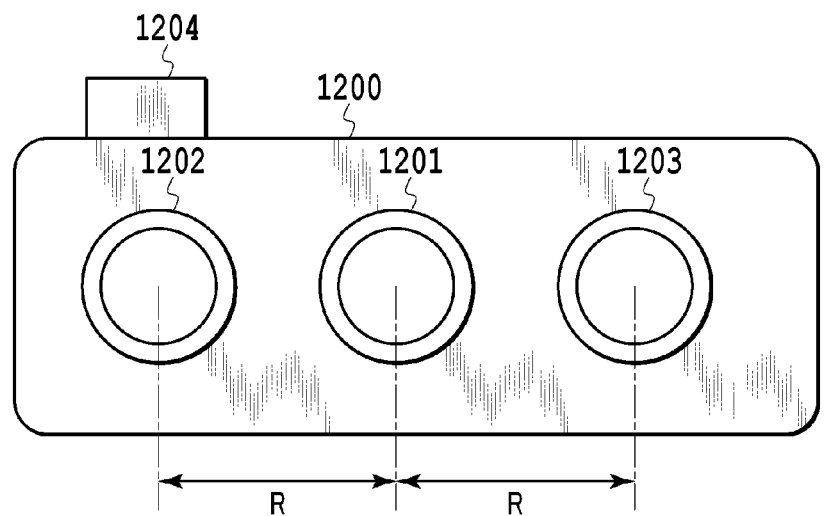
FIGS. 12A and 12B are diagrams showing an example of a multiple-lens image-capturing apparatus including a plurality of image-capturing units according to Embodiment 4 of the present invention.
Figure 12B:
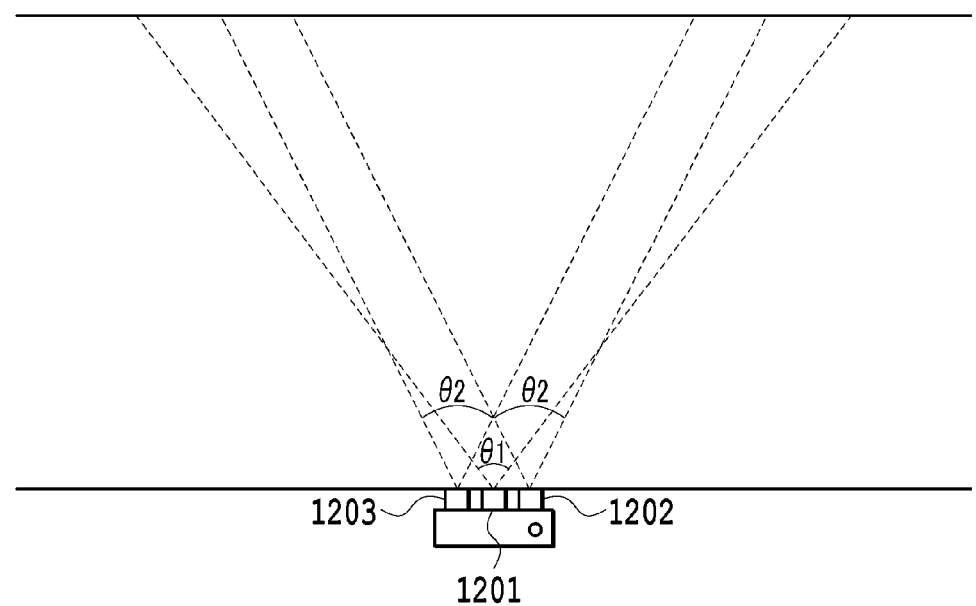

The difference between Embodiment 4 and Embodiments 1 to 3 is the image-capturing apparatus 100 and the virtual-angle-of-view-image generating process S503. FIG. 12A shows an example of the image-capturing apparatus in Embodiment 4. A casing 1200 of the image-capturing apparatus includes three image-capturing units 1201 to 1203 configured to obtain captured image data and an image-capturing button 1204. As shown in FIG. 12B, the image-capturing units 1201 to 1203 are disposed in such a way as to have their respective optical axes in parallel with one another. In this embodiment, the gap between each adjacent pair of the image-capturing units 1201 to 1203 is R. The horizontal angle of view of the image-capturing unit 1201 is θ1, and the vertical angle of view thereof is φ1. The horizontal angle of view of each of the image-capturing units 1202, 1203 is θ2, and the vertical angle of view thereof is φ2. In other words, the image-capturing unit 1202 and the image-capturing unit 1203 have the same angles of view. Note that the horizontal angles of view satisfy θ1>θ2, and the vertical angles of view satisfy φ1>φ2. Thus, the image-capturing unit 1201 has wider angles of view than the image-capturing units 1202, 1203. As the user presses the image-capturing button 1204, the image-capturing units 1201 to 1203 receive light at their sensors (image-capturing devices) as optical information on an object. The optical signals thus received are A/D converted, and a plurality of pieces of captured image data are captured simultaneously. A distance L from the image-capturing apparatus 1200 to the object calculated based on the focus settings at the time of the image capture and the like is attached to each piece of the captured image data as tag information. In the following, captured images represented by the pieces of captured image data captured by the image-capturing units 1201, 1202, 1203 will be denoted by I1, I2, I3, respectively.

With the multiple-lens image-capturing apparatus configured as above, it is possible to obtain a plurality of color images of the same object captured from a plurality of points of view. Note that although the number of image-capturing units is three here, the number of image-capturing units is not limited to three. The above is an example of the image-capturing apparatus in Embodiment 4.

Figure 13:
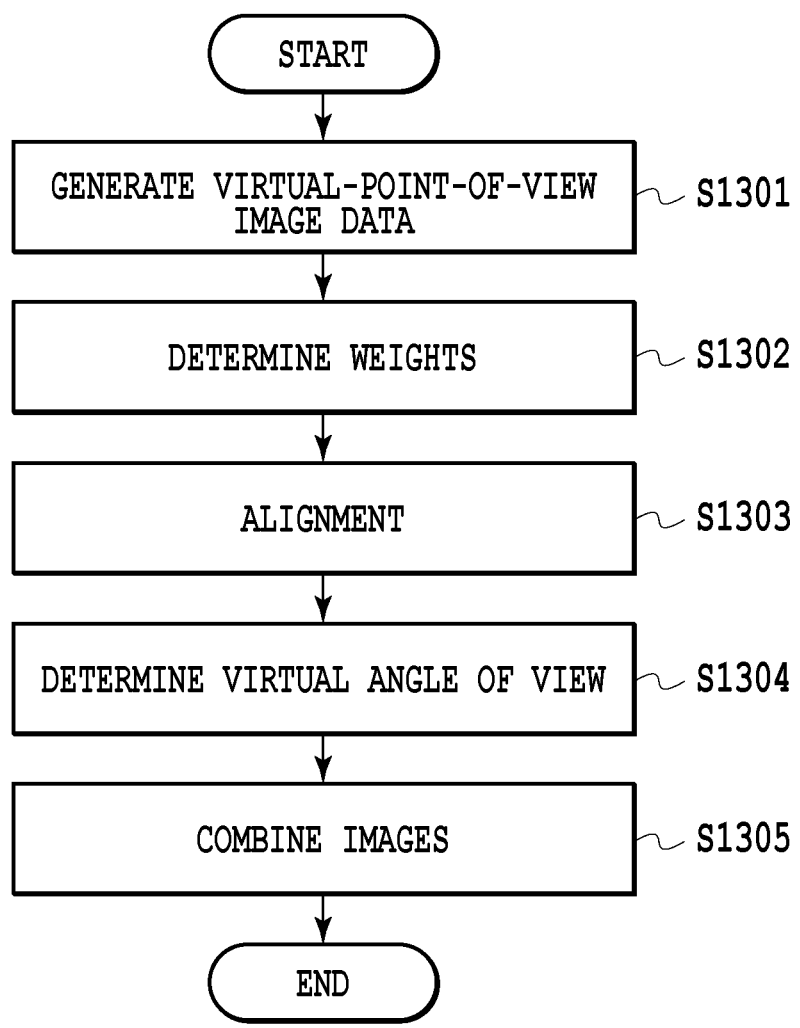
FIG. 13 is a flowchart showing the operations in a virtual-angle-of-view-image generating process according to Embodiment 4 of the present invention.

Next, details of the virtual-angle-of-view-image-data generating process in Embodiment 4 will be described with reference to a flowchart shown in FIG. 13.

First, in step S1301, an image-processing unit 212 generates image data corresponding to a point of view between the image-capturing unit 1202 and the image-capturing unit 1203 from a captured image I2 and a captured image I3 represented by pieces of captured image data 404 by using a parallax interpolation process. In other words, the image-processing unit 212 generates virtual-point-of-view image data from pieces of captured image data having the same angles of view. Specifically, the image-processing unit 212 generates virtual-point-of-view image data representing a virtual-point-of-view image I' corresponding to the point of view of the image-capturing unit 1201. An existing method is utilized for the parallax interpolation process. For example, the virtual-point-of-view image I' corresponding to the point of view of the image-capturing unit 1201 may be generated based on the amount of parallax between each pair of corresponding pixels of the captured image I2 and the captured image I3 determined by performing block matching using the two images. Alternatively, the virtual-point-of-view image I' corresponding to the point of view of the image-capturing unit 1201 may be generated by associating characteristic points extracted from the two images and by performing a morphing process based on the correspondence between the characteristic points.

Then, in step S1302, the image-processing unit 212 determines weights to be applied to the captured image data 404 and the virtual-point-of-view image data for the virtual-angle-of-view image data 407 to be generated. Specifically, the image-processing unit 212 determines the weights based on the angles of view θ1, θ2 included in image-capture information 405 and a virtual angle of view θ' included in an image-processing parameter 406. In Embodiment 4, the weights to be applied to the captured image I1 and the virtual-point-of-view image I' are determined. Note that details of this process are similar to those in step S601.

Then, in step S1303, the captured image I1 and the virtual-point-of-view image I' are aligned. Specifically, similarly to step S602, affine parameters a1 to a6 which indicate the positional relationship between the pixels (x, y) of the captured image I1 and the pixels (x', y') of the virtual-point-of-view image I' are determined. The difference from step S602 is the method of determining ΔS, ΔT, and they are found by the following equations in this embodiment.

$$\Delta S = L\left(\tan\left(\frac{\theta 1}{2}\right) - \tan\left(\frac{\theta 2}{2}\right)\right) \quad (13)$$

$$\Delta T = L\left(\tan\left(\frac{\phi 1}{2}\right) - \tan\left(\frac{\phi 2}{2}\right)\right)$$

The affine parameters a1 to a6 determined as described above are stored into a storage device such as a RAM 202.

Then, in step S1304, the image-processing unit 212 sets a virtual-angle-of-view area in the captured image I1 based on the virtual angle of view θ' included in the image-processing parameter 406. Details of this process are similar to those in step S603.

Lastly, in step S1305, the image-processing unit 212 generates virtual-angle-of-view image data 407 representing a virtual-angle-of-view image from the captured image I1 and the virtual-point-of-view image I'. In step S1305, the virtual-angle-of-view image data 407 representing the virtual-angle-of-view image is generated by using the weights w1, w2 stored in step S1302, the affine parameters a1 to a6 stored in step S1303, and the affine parameters b1 to b6 stored in step S1304. Details of this process are the same as those in step S604 except that I2 is I'.

By performing the processes described above, good virtual-angle-of-view image data 407 can be generated even from an object that has depth.

Embodiment 5

In Embodiment 4, the example is described in which good virtual-angle-of-view image data is generated from an object that has depth by generating a virtual-point-of-view image corresponding to the same point of view as a captured image and by using the captured image and the virtual-point-of-view image.

In Embodiment 5, first, a plurality of virtual-point-of-view images having different angles of view corresponding to a predetermined point of view are generated from captured images. Then, of the plurality of virtual-point-of-view images thus generated, virtual-point-of-view images having angles of view closer to a desired virtual angle of view are preferentially used to generate a virtual-angle-of-view image. In this way, the enlargement magnification of an image-enlargement process to be performed on each virtual-point-of-view image can be made small. Accordingly, it is possible to perform higher-magnification digital zoom than that in Embodiment 4 on an object having depth while suppressing decrease in the resolution of the image.

The difference between Embodiment 5 and Embodiments 1 to 4 is the image-capturing apparatus 100 and the virtual-angle-of-view-image generating process S503.

Figure 14A:
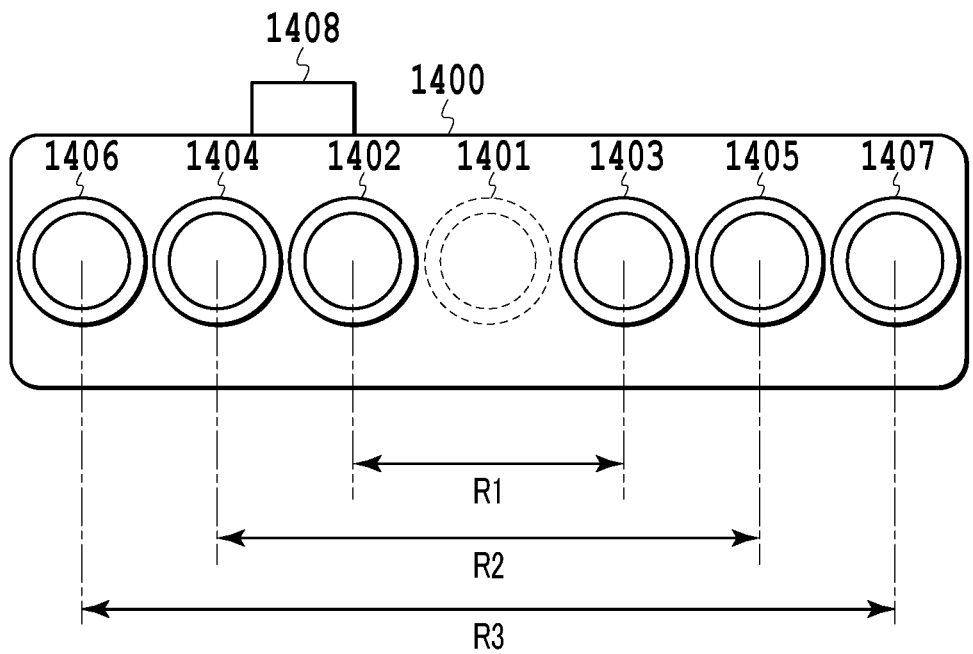
FIGS. 14A and 14B are diagrams showing an example of a multiple-lens image-capturing apparatus including a plurality of image-capturing units according to Embodiment 5 of the present invention.
Figure 14B:
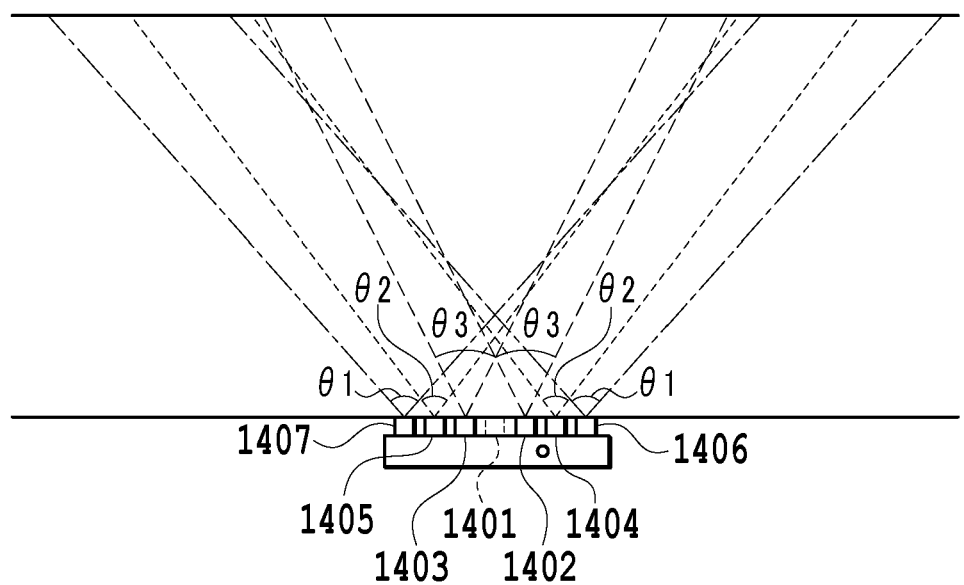

FIG. 14A shows an example of the image-capturing apparatus in Embodiment 5. An image-capturing apparatus 1400 includes six image-capturing units 1402 to 1407 configured to obtain color images, and an image-capturing button 1408. As shown in FIG. 14B, the image-capturing units 1402 to 1407 are disposed in such a way as to have their respective optical axes in parallel with one another. In this embodiment, the gap between the image-capturing units 1402, 1403 is R1, the gap between the image-capturing units 1404, 1405 is R2, and the gap between the image-capturing units 1406, 1407 is R3. Moreover, the horizontal angle of view of each of the image-capturing units 1402, 1403 is θ3, and the vertical angle of view thereof is φ3, the horizontal angle of view of each of the image-capturing units 1404, 1405 is θ2, and the vertical angle of view thereof is φ2, and the horizontal angle of view of each of the image-capturing units 1406, 1407 is θ1, and the vertical angle of view thereof is φ1. Note that the horizontal angles of view satisfy θ1>θ2>θ3, and the vertical angles of view satisfy φ1>φ2>φ3. Thus, the image-capturing units 1406 and the image-capturing unit 1407 have the widest angles of view, and the image-capturing units 1402 and the image-capturing unit 1403 have the narrowest angles of view. Moreover, the image-capturing units having the same angles of view are disposed symmetrically about a virtual-point-of-view position 1401.

As the user presses the image-capturing button 1408, the image-capturing units 1402 to 1407 receive light at their sensors (image-capturing devices) as optical information on an object. The optical signals thus received are A/D converted, and a plurality of pieces of color image data (digital data) are captured simultaneously. A distance L from the image-capturing apparatus 1400 to the object calculated based on the focus settings at the time of the image capture and the like is attached to each piece of the color image data as tag information. In the following, captured images captured by the image-capturing units 1402, 1403, 1404, 1405, 1406, 1407 will be denoted by I2, I3, I4, I5, I6, I7, respectively.

With the multiple-lens image-capturing apparatus configured as above, it is possible to obtain a plurality of color images of the same object captured from a plurality of points of view. Note that although the number of image-capturing units is six here, the number of image-capturing units is not limited to six. The above is an example of the image-capturing apparatus in Embodiment 5.

Next, details of the virtual-angle-of-view-image generating process in Embodiment 5 will be described with reference to a flowchart shown in FIG. 15. In summary, first, three pieces of virtual-point-of-view image data of different angles of view corresponding to the virtual-point-of-view position 1401 shown in FIG. 14A are generated from pieces of captured image data 404 by a parallax interpolation process. Then, virtual-angle-of-view image data is generated based on the three pieces of virtual-point-of-view image data. In the following description, the generation of virtual-point-of-view image data will be expressed simply as the generation of a virtual-point-of-view image for the sake of simple explanation. Likewise, the generation of virtual-angle-of-view image data will be expressed simply as the generation of a virtual-angle-of-view image. Now, the virtual-angle-of-view-image generating process will be described in detail with reference to the flowchart.

First, in step S1501, an image-processing unit 212 generates an image corresponding to a position between the image-capturing unit 1402 and the image-capturing unit 1403 from the captured images I2, I3 included in the captured image data 404 by using a parallax interpolation process. Specifically, the image-processing unit 212 generates a virtual-point-of-view image I1' corresponding to the virtual-point-of-view position 1401. An existing method is utilized for the parallax interpolation process as in Embodiment 4.

Then, in step S1502, the image-processing unit 212 generates an image corresponding to a position between the image-capturing unit 1404 and the image-capturing unit 1405 from the captured images I4, I5 included in the captured image data 404 by using a parallax interpolation process. Specifically, the image-processing unit 212 generates a virtual-point-of-view image I2' corresponding to the virtual-point-of-view position 1401. An existing method is utilized for the parallax interpolation process as in Embodiment 4.

Then, in step S1503, the image-processing unit 212 generates an image corresponding to a position between the image-capturing unit 1406 and the image-capturing unit 1407 from the captured images I6, I7 included in the captured image data 404 by using a parallax interpolation process. Specifically, the image-processing unit 212 generates a virtual-point-of-view image I3' corresponding to the position of the virtual-point-of-view position 1401. An existing method is utilized for the parallax interpolation process as in Embodiment 4.

Then, in step S1504, the image-processing unit 212 calculates weights to be applied to the virtual-point-of-view images I1', I2', I3' for a virtual-angle-of-view image 407 to be generated, based on the angles of view θ1, θ2, θ3 and a virtual angle of view θ' included in image-captured information 405. The weights to be applied to the virtual-point-of-view images I1', I2', I3' are denoted by w1, w2, w3, respectively. FIG. 16A shows an example of the relationship between the virtual angle of view θ' and the weights w1, w2, w3. In FIG. 16A, the weights w1, w2, w3 inside a range of θ1>θ'≥θ2 are such that the weights w1, w2 are suitably changed while the weight w3 is fixed at 0 and remains unchanged. Specifically, the weights w1, w2, w3 are described by the following equations.

$$w1 = \frac{\theta' - \theta 2}{\theta 1 - \theta 2} \quad (14)$$

$$w2 = 1 - w1$$

$$w3 = 0$$

Moreover, inside a range of θ2>θ'≥θ3, the weight w1 is fixed at 0 and remains unchanged while the weights w2, w3 are suitably changed. Specifically, the weights w1, w2, w3 are described by the following equations.

$$w1 = 0 \quad (15)$$

$$w2 = -\frac{\theta' - \theta 3}{\theta 2 - \theta 3}$$

$$w3 = 1 - w2$$

By setting the weights as described above, the virtual-angle-of-view image can be generated with larger weights applied to virtual-point-of-view images having closer angles of view to the virtual angle of view. In this way, the enlargement magnification of an image enlargement process to be performed on each virtual-point-of-view image can be made small. Accordingly, it is possible to perform high-magnification digital zoom on an object having depth while suppressing decrease in the resolution of the image.

Note that the method of calculating the weights w1, w2, w3 is not limited to the above method. As shown in FIG. 16B, a threshold θτ1 and a threshold θτ2 set with respect to the virtual angle of view may be used to calculate the weights w1, w2, w3. The threshold θτ1 and the threshold θτ2 are recorded in a ROM 203 in advance and are utilized by loading them into a RAM 202 at the time of starting the image-processing apparatus. Specifically, the calculation of the weights w1, w2, w3 using the threshold θτ1 and the threshold θτ2 is described by the following equations.

w1=1,w2=w3=0  (θ'≤θτ1)

w2=1,w1=w3=0  (θτ1<θ'≤θτ2)

w1=w2=0,w3=1  (θτ2<θ')  (16)

The above equations assume θ1>θτ1≥θ2 and θ2>θτ2≥θ3. The weighting shown in FIG. 16B corresponds to the resolution priority mode in Embodiment 2. That is, by setting the threshold θτ1 equal to θ1 (θτ1=θ1), the virtual-point-of-view image I2' which has higher perceived resolution than the virtual-point-of-view image I1' can be preferentially used within a range of θ1>θ'≥θ2. Likewise, by setting the threshold θτ2 equal to θ2 (θτ2=θ2), the virtual-point-of-view image I3' which has higher perceived resolution than the virtual-point-of-view image I2' can be preferentially used within a range of θ2>θ'≥θ3. Accordingly, the perceived resolution of the virtual-angle-of-view image 407 can be improved. The weights w1, w2, w3 thus calculated are stored into a storage device such as the RAM 202.

Note that in this embodiment, too, the above weight calculating method can be switched according to a mode selected by the user as described in Embodiment 2. Specifically, the weights in FIG. 16B can be used in the resolution priority mode, and weights as shown in FIG. 16A can be used in the noise-reduction priority mode.

Then, in step S1505, the image-processing unit 212 aligns the virtual-point-of-view images I1', I2', I3'. This alignment is performed for a plurality of sets of two images. Specifically, the alignment is achieved by combining alignment of the virtual-point-of-view images I1', I2' and alignment of the virtual-point-of-view images I2', I3'.

In the alignment of the virtual-point-of-view images I1', I2', they are associated with each other such that the object in the virtual-point-of-view image I1' and the object in the virtual-point-of-view image I2' overlap each other. Specifically, in the alignment, the pixels (x1',y1') of the virtual-point-of-view image I1' and the pixels (x2', y2') of the virtual-point-of-view image I2' are associated with each other by using affine parameters a1 to a6. The relationships between the pixels (x1', y1') and the pixels (x2', y2') and the affine parameters a1 to a6 are described by the following equations.

x2'=a1x1'+a2y1'+a3 y2'=a4x1'+a5y1'+a6  (17)

An example of the method of determining the affine parameters a1 to a6 will be described below. Here, the affine parameters a1 to a6 are calculated according to the following equations based on the angles of view of the virtual-point-of-view image I1', the angles of view of the virtual-point-of-view image I2', and the distance L to the object.

$$a1 = \frac{\tan(\theta 2/2)}{\tan(\theta 1/2)} \quad (18)$$

$$a3 = s1$$

$$a5 = \frac{\tan(\phi 2/2)}{\tan(\phi 1/2)}$$

$$a6 = t1$$

$$a2 = a4 = 0$$

Figure 17:
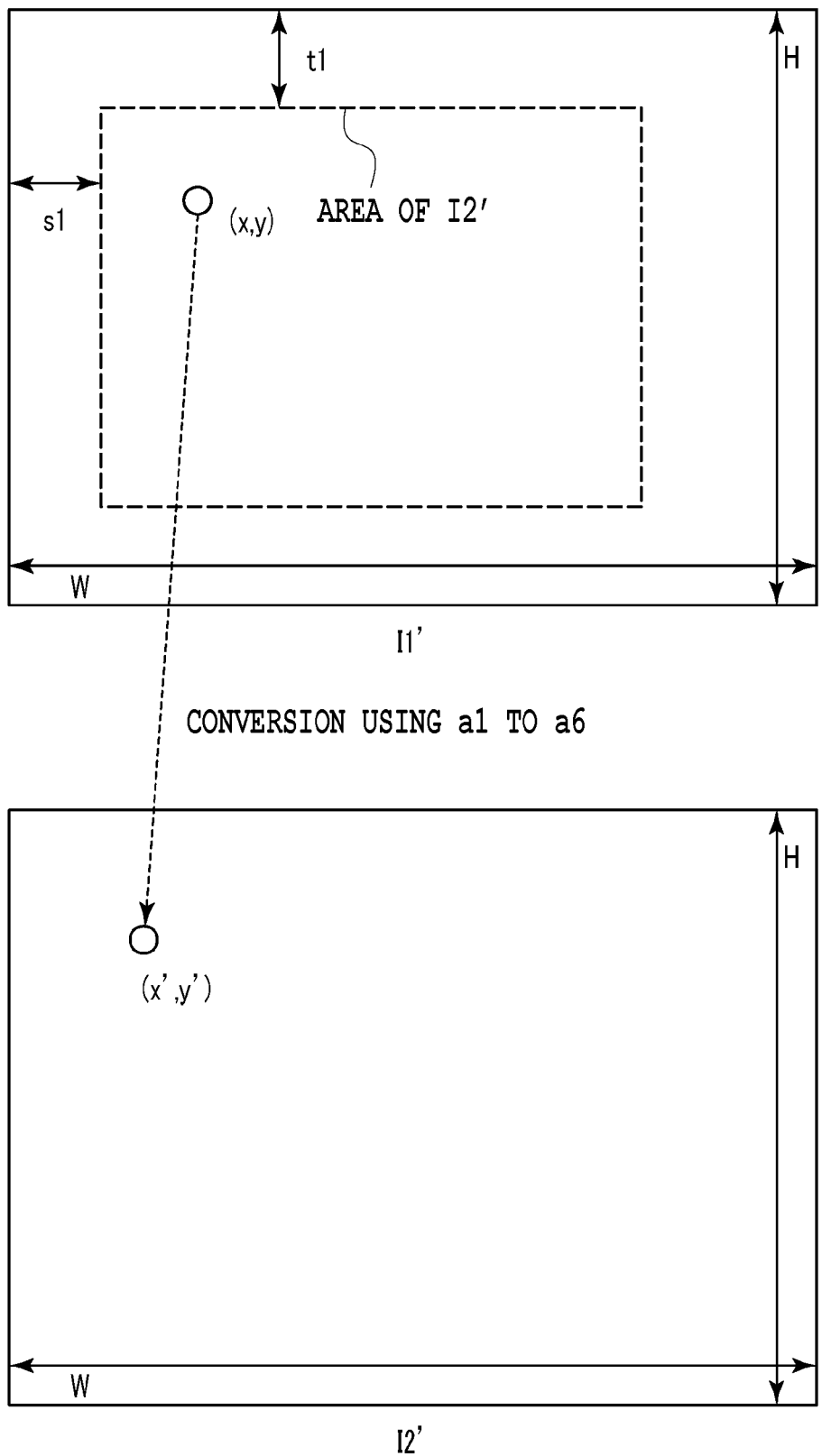
FIG. 17 is a diagram showing the correspondence between a virtual-point-of-view image I1' and a virtual-point-of-view image I2' in Embodiment 5 of the present invention.

Here, as shown in FIG. 17, s1, t1 correspond respectively to the distances from the area of the virtual-point-of-view image I2' in the virtual-point-of-view image I1' to ends of the virtual-point-of-view image I1' after the alignment, and can be found by the following equations.

$$s1 = \frac{W}{2L\tan(\theta 1/2)}\Delta S \quad (19)$$

-continued $$t1 = \frac{H}{2L\tan(\phi 1/2)} \Delta T$$

Here, W, H denote the size of the virtual-point-of-view image I1'. Moreover, ΔS, ΔT denote the lengths of cut portions the object and can be found by the following equations.

$$\Delta S = L\left(\tan\left(\frac{\theta 1}{2}\right) - \tan\left(\frac{\theta 2}{2}\right)\right) \quad (20)$$

$$\Delta T = L\left(\tan\left(\frac{\phi 1}{2}\right) - \tan\left(\frac{\phi 2}{2}\right)\right)$$

Next, the alignment of the virtual-point-of-view image I2' and the virtual-point-of-view image I3' will be described. The pixels (x2',y2') of the virtual-point-of-view image I2' and the pixels (x3', y3') of the virtual-point-of-view image I3' are associated with each other by using affine parameters a'1 to a'6 such that the object in the virtual-point-of-view image I2' and the object in the virtual-point-of-view image I3' overlap each other. The relationships between the pixels (x2', y2') and the pixels (x3', y3') and the affine parameters a'1 to a'6 are described by the following equations.

$$x3' = a'1x2' + a'2y2' + a'3$$

$$y3' = a'4x2' + a'5y2' + a'6 \quad (21)$$

An example of the method of determining the affine parameters a'1 to a'6 will be described below. Here, the affine parameters a'1 to a'6 are calculated according to the following equations based on the angles of view of the virtual-point-of-view image I2', the angles of view of the virtual-point-of-view image I3', and the distance L to the object.

$$a'1 = \frac{\tan(\theta 3/2)}{\tan(\theta 2/2)} \quad (22)$$

$$a'3 = s2$$

$$a'5 = \frac{\tan(\phi 3/2)}{\tan(\phi 2/2)}$$

$$a'6 = t2$$

$$a'2 = a'4 = 0$$

Here, s2, t2 correspond respectively to the distances from the area of the virtual-point-of-view image I3' in the virtual-point-of-view image I2' (not shown) to ends of the virtual-point-of-view image I2' after the alignment, and can be found by the following equations.

$$s2 = \frac{W2}{2L\tan(\theta 2/2)} \Delta S \quad (23)$$

$$t2 = \frac{H2}{2L\tan(\phi 2/2)} \Delta T$$

Here, W2, H2 denote the size of the virtual-point-of-view image I2'. Moreover, ΔS, ΔT denote the lengths of cut portions the object and can be found by the following equations.

$$\Delta S = L\left(\tan\left(\frac{\theta 2}{2}\right) - \tan\left(\frac{\theta 3}{2}\right)\right) \quad (24)$$

$$\Delta T = L\left(\tan\left(\frac{\phi 2}{2}\right) - \tan\left(\frac{\phi 3}{2}\right)\right)$$

The affine parameters a1 to a6, a'1 to a'6 calculated as described above are stored into the storage device such as the RAM 202.

Figure 18:
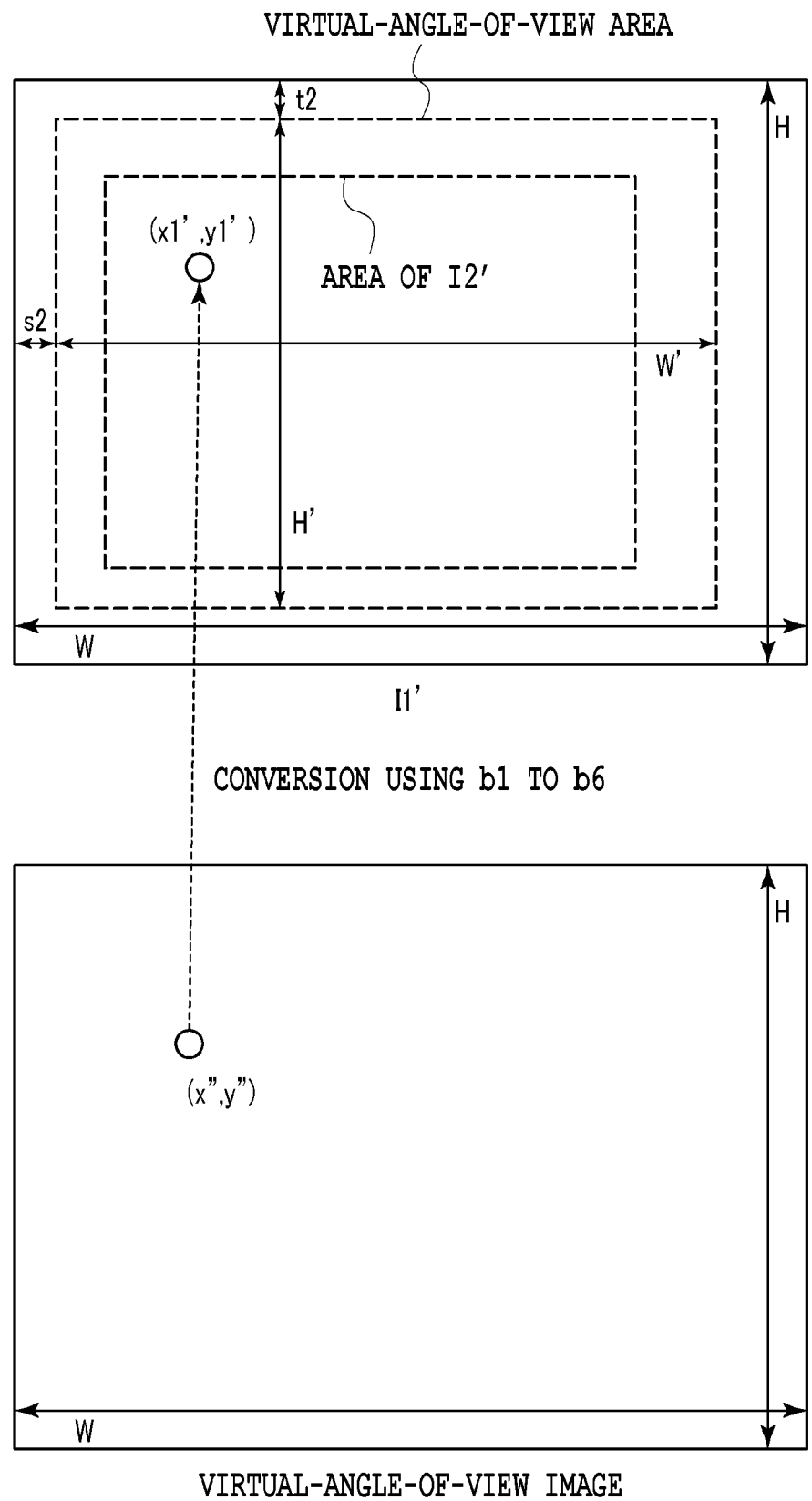
FIG. 18 is a diagram showing the correspondence between the virtual-point-of-view image I1' and a virtual-angle-of-view image in Embodiment 5 of the present invention.

Then, in step S1506, the image-processing unit 212 sets a virtual-angle-of-view area in the virtual-point-of-view image I1' based on the virtual angle of view θ' included in an image-processing parameter 406. Specifically, as shown in FIG. 18, the image-processing unit 212 determines affine parameters b1 to b6 which indicate the relationship between the pixels (x1', y1') of the virtual-point-of-view image I1' and the pixels (x",y") of the virtual-angle-of-view image 407. Equations therefor are shown below.

$$x1' = b1x'' + b2y'' + b3$$

$$y1' = b4x'' + b5y'' + b6 \quad (25)$$

An example of the method of determining the affine parameters b1 to b6 will be described below. Here, the affine parameters b1 to b6 are determined according to the following equations based on the angles of view of the virtual-point-of-view image I1', the angles of view of the virtual-angle-of-view image, and the size of the virtual-point-of-view image I1'.

$$b1 = \frac{W'}{W} \quad (26)$$

$$b3 = s3$$

$$b5 = \frac{H'}{H}$$

$$b6 = t3$$

$$b2 = b4 = 0$$

Here, W, H denote the width and height of the virtual-point-of-view image I1', respectively. W', H' denote the width and height of the virtual-angle-of-view area in the virtual-point-of-view image I1', respectively. Here, s3, t3 correspond respectively to the distances from the virtual-angle-of-view area shown in FIG. 18 to the ends of the virtual-point-of-view image I1', and can be found by the following equations, for example.

$$s3 = \frac{W}{2}\left(1 - \frac{\tan(\theta'/2)}{\tan(\theta 1/2)}\right) \quad (27)$$

$$t3 = \frac{H}{2}\left(1 - \frac{\tan(\phi'/2)}{\tan(\phi 1/2)}\right)$$

The affine parameters b1 to b6 determined as described above are stored into the storage device such as the RAM 202.

Lastly, in step S1507, the image-processing unit 212 generates the virtual-angle-of-view image data 407 from the virtual-point-of-view images I1', I2', I3'. In step S1507, the virtual-angle-of-view image data 407 is generated by using the weights w1, w2, w3 stored in step S1504, the affine parameters a1 to a6, a'1 to a'6 stored in step S1505, and the affine parameters b1 to b6 stored in step S1506. Specifically, the virtual-angle-of-view image 407 is generated by finding weighted means of the virtual-point-of-view image I1', I2', I3' according to the following equations.

$$I''(x'', y'') = \begin{cases} w1I1'(x1', y1') + \\ w2I2'(x2', y2') + & \text{if}(x3', y3') \text{ is included in } I3' \\ w3I3'(x3', y3') \\ w1I1'(x1', y1') + & \text{if}(x3', y3') \text{ is not included in } I3' \\ w2I2'(x2', y2') & \text{but}(x2', y2') \text{ is not included in } I2' \\ I1'(x1', y1') & \text{if}(x2', y2') \text{ is included in } I2' \end{cases} \quad (28)$$

Figure 19:
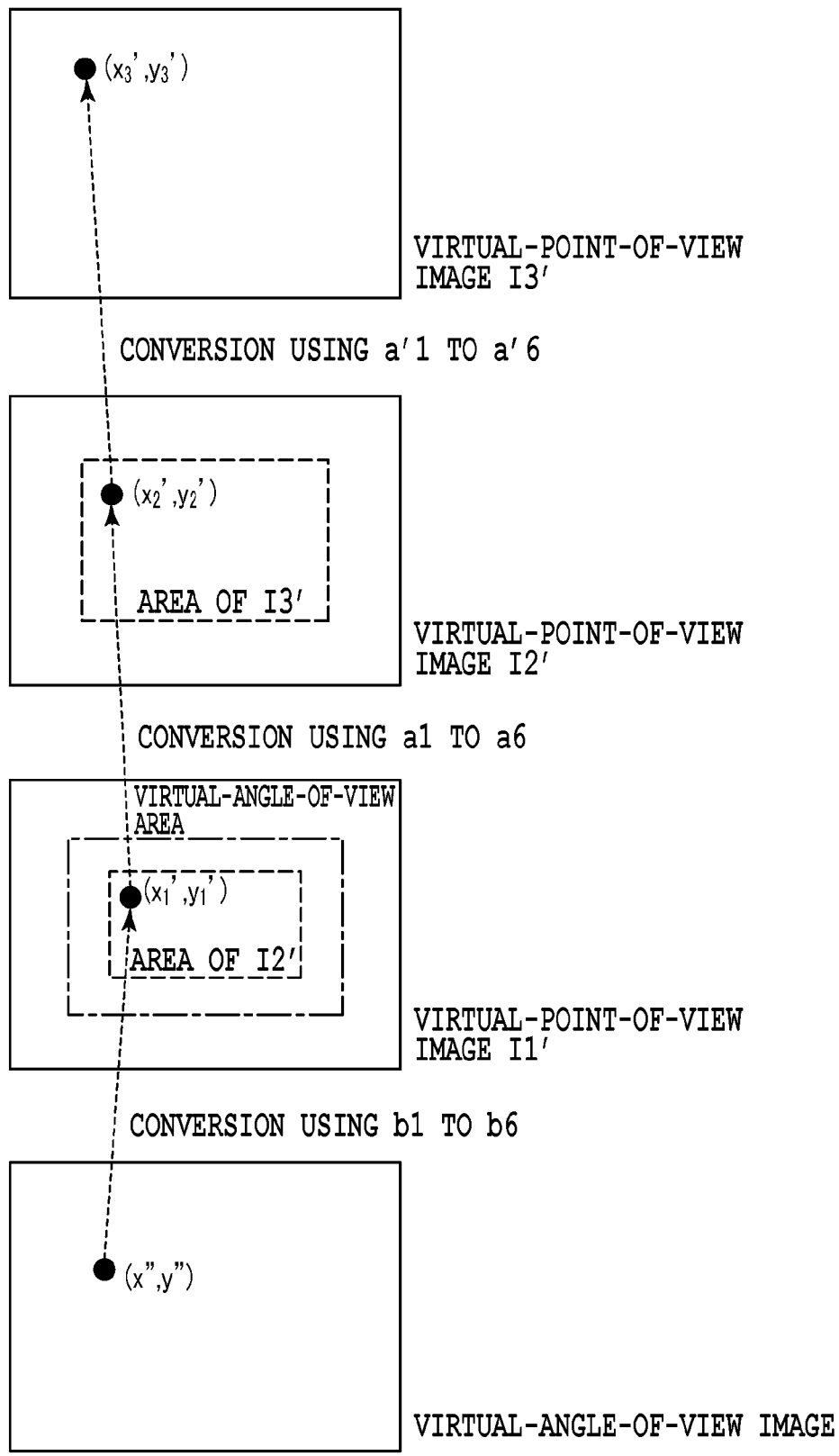
FIG. 19 is a diagram showing the corresponding between the virtual-point-of-view image I1' and the virtual-point-of-view image I2' and a virtual-point-of-view image I3' and the virtual-angle-of-view image after an image-combining process of the present invention.

Here, I'' is the virtual-angle-of-view image data 407. FIG. 19 schematically shows the correspondence between the virtual-angle-of-view image and the virtual-point-of-view images after the affine conversion processes. The pixels (x'', y'') of the virtual-angle-of-view image are determined from the pixels (x1', y1') of the virtual-point-of-view image I1' and the affine parameters b1 to b6. Moreover, the pixels (x2', y2') of the virtual-point-of-view image I2' corresponding to the pixels (x'', y'') of the virtual-angle-of-view image are determined from the corresponding pixels (x1', y1') of the virtual-point-of-view image I1' and the affine parameters a1 to a6. Furthermore, the pixels (x3',y3') of the virtual-point-of-view image I3' corresponding to the pixels (x'', y'') of the virtual-angle-of-view image are determined from the corresponding pixels (x2',y2') of the virtual-point-of-view image I2' and the affine parameters a'1 to a'6. The virtual-angle-of-view image data 407 thus generated is stored into the storage device such as the RAM 202. By the above step, the virtual-angle-of-view-image generating process is finished.

By performing the processes described above, good virtual-angle-of-view image data 407 can be generated even from an object that has depth.

Moreover, in this embodiment, a virtual-angle-of-view image can be generated based on the virtual angle of view θ' within a range from the angle of view θ1 to the angle of view θ3. Accordingly, it is possible to perform high-magnification digital zoom as compared to the case where a virtual-angle-of-view image is generated based on the virtual angle of view θ' within a range from the angle of view θ1 to the angle of view θ2 by using captured images and a virtual-point-of-view image as described in Embodiment 4.

Figure 15:
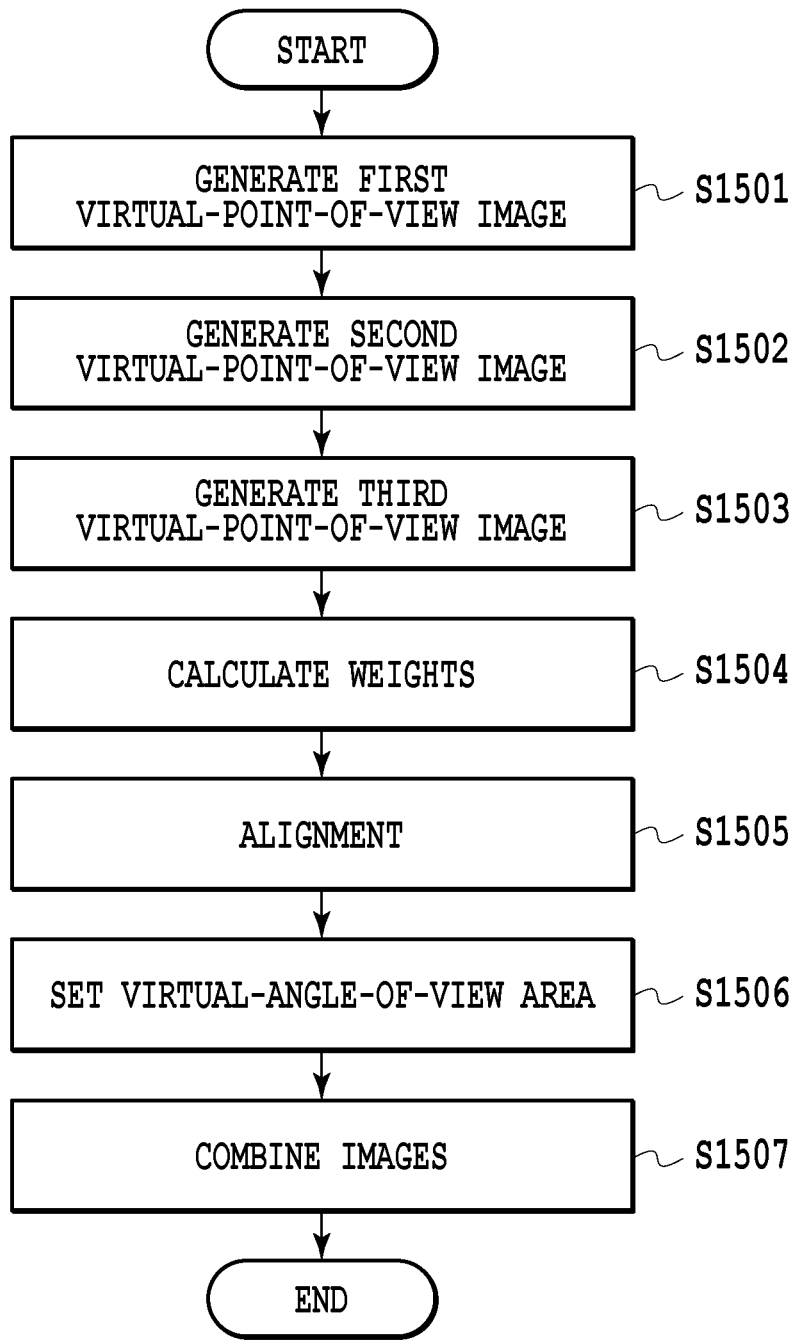
FIG. 15 is a flowchart showing the operations in a virtual-angle-of-view-image generating process according to Embodiment 5 of the present invention.

In FIG. 15, the virtual-point-of-view images I1', I2', I3' are generated insteps S1501 to S1503. Note, however, that the number of virtual-point-of-view images to be generated is not limited to three. Thus, in FIG. 14B, it is possible to generate a virtual-angle-of-view image based on the virtual angle of view θ' within a range from the angle of view θ1 to an angle of view θ4 not shown.

It is the characteristic point of this embodiment that the use of a plurality of virtual-point-of-view images of different angles of view as described above enables high-magnification digital zoom while deterioration in the resolution of the virtual-point-of-view image due to an enlargement process is suppressed to a predetermined degree.

Note that in this embodiment, too, a virtual-angle-of-view image can be generated by using a captured image and a virtual-point-of-view image as described in Embodiment 4. Specifically, another image-capturing unit may be installed at the virtual-point-of-view position 1401, and an image I1 obtained from the virtual-point-of-view position 1401 and the virtual-point-of-view image I1' may be used to generate a virtual-angle-of-view image.

Note that a virtual-angle-of-view image can be generated also by using all the virtual-point-of-view images I1', I2', I3'. This can be realized by, for example, setting the weights w1, w2, w3 to ⅓ in step S1504.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-105157, filed May 17, 2013, which is hereby incorporated by reference herein in its entirety.

What is claimed is:

1. An image-processing apparatus, comprising:
an obtaining unit configured to obtain first image data having a first angle of view obtained by image-capturing and second image data having a second angle of view smaller than the first angle of view, the second image data corresponding to the same viewpoint as the first image data, wherein the second image data has been generated using fourth image data and fifth image data each having the second angle of view and each captured from viewpoints different from each other; and
a generating unit configured to generate third image data, corresponding to the same viewpoint as the first and second image data, by performing weighted combination of the first image data and the second image data, the third image data having a third angle of view determined according to a user command, wherein the third image data has an angle of view that is smaller than the first angle of view but is larger than the second angle of view,
wherein the generating unit determines weights on the first image data and the second image data used for the weighted combination such that the closer the third angle of view is to the second angle of view, the larger the weight on the second image data is relative to the weight on the first image data, and wherein the generating unit performs the weighted combination of the first image data and the second image data using the determined weights.

2. The image-processing apparatus according to claim 1, wherein
the generating unit provides each of pixels of the second image data with a weight value corresponding to a distance from an end of the second image data to the pixel, and
the generating unit performs the weighted combination by further using the weight value corresponding to the distance from the end.

3. The image-processing apparatus according to claim 2, wherein the generating unit determines the weight value corresponding to the distance from the end such that the longer the distance from the end, the larger the weight value is.

4. The image-processing apparatus according to claim 1, wherein the generating unit aligns corresponding pixels of the first image data and the second image data and performs the weighted combination.

5. The image-processing apparatus according to claim 4, wherein the generating unit performs the alignment based on the third angle of view, the first angle of view, and the second angle of view, positions of image-capturing units which have captured the first image data and the second image data, and a distance to an object.

6. The image-processing apparatus according to claim 4, wherein the generating unit performs the weighted combination by applying the determined weights to the corresponding pixels of the first image data and the second image data.

7. The image-processing apparatus according to claim 1, wherein the generating unit generates the third image data by adding at least part of the plurality of pieces of image data by using the weights.

8. The image-processing apparatus according to claim 1, wherein the generating unit changes a standard for determining the weights according to a mode.

9. The image-processing apparatus according to claim 8, wherein the generating unit is capable of a first mode in which the weights are continuously changed according to the third angle of view, and a second mode in which a threshold is set for the third angle of view and the weights are discontinuously switched before and after the threshold.

10. The image-processing apparatus according to claim 1, wherein
the generating unit includes a correcting unit configured to correct the weights for each of areas of the third image data, and
the generating unit generates the third image data by using the weights corrected by the correcting unit.

11. The image-processing apparatus according to claim 10, wherein the correcting unit corrects the weights based on a difference between the first image data and the second image data.

12. An image-capturing apparatus, comprising:
a first image capturing unit configured to capture first image data having a first angle of view;
a second image capturing unit configured to capture fourth image data having a second angle of view smaller than the first angle of view;
a third image capturing unit configured to capture fifth image data having the second angle of view, wherein the second image capturing unit and the third image capturing unit have viewpoints different from each other;

an obtaining unit configured to obtain the first image data and second image data, the second image data corresponding to the same viewpoint as the first image data, wherein the second image data has been generated using the fourth image data and the fifth image data; and
a generating unit configured to generate third image data, corresponding to the same viewpoint as the first and second image data, by performing weighted combination of the first image data and the second image data, the third image data having a third angle of view determined according to a user command, wherein the third image data has an angle of view that is smaller than the first angle of view but is larger than the second angle of view,
wherein the generating unit determines weights on the first image data and the second image data used for the weighted combination such that the closer the third angle of view is to the second angle of view, the larger the weight on the second image data is relative to the weight on the first image data, and
wherein the generating unit performs the weighted combination of the first image data and the second image data using the determined weights.

13. An image-processing method, comprising:
an obtaining step of obtaining first image data having a first angle of view obtained by image-capturing and second image data having a second angle of view smaller than the first angle of view, the second image data being image data corresponding to the same viewpoint as the first image data, wherein the second image data has been generated using fourth image data and fifth image data each having the second angle of view and each captured from viewpoints different from each other; and
a generating step of generating third image data, corresponding to the same viewpoint as the first and second image data, by performing weighted combination of the first image data and the second image data, the third image data having a third angle of view determined according to a user command, wherein the third image data has an angle of view that is smaller than the first angle of view but is larger than the second angle of view,
wherein in the generating step,
weights on the first image data and the second image data used for the weighted combination are determined such that the closer the third angle of view is to the second angle of view, the larger the weight on the second image data is relative to the weight on the first image data, and
the weighted combination of the first image data and the second image data is performed using the determined weights.

14. An image-capturing method, comprising:
a first capturing step of capturing first image data having a first angle of view;
a second capturing step of capturing fourth image data having a second angle of view smaller than the first angle of view;
a third image capturing step of capturing fifth image data having the second angle of view, wherein the second image capturing step and the third image capturing step is performed in viewpoints different from each other;
an obtaining step of obtaining the first image data and second image data, the second image data being image data corresponding to the same viewpoint as the first image data, wherein the second image data has been generated using the fourth image data and the fifth image data; and a generating step of generating third image data, corresponding to the same viewpoint as the first and second image data, by performing weighted combination of the first image data and the second image data, the third image data having a third angle of view determined according to a user command, wherein the third image data has an angle of view that is smaller than the first angle of view but is larger than the second angle of view, wherein in the generating step, weights on the first image data and the second image data in the weighted combination are determined such that the closer the third angle of view is to the second angle of view, the larger the weight on the second image data is relative to the weight on the first image data, and the weighted combination of the first image data and the second image data is performed using the determined weights.

15. A non-transitory computer readable storage medium storing a program configured to cause a computer to execute an image-processing method, the image-processing method comprising:

an obtaining step of obtaining first image data having a first angle of view obtained by image-capturing and second image data having a second angle of view smaller than the first angle of view, the second image data being image data corresponding to the same viewpoint as the first image data, wherein the second image data has been generated using fourth image data and fifth image data each having the second angle of view and each captured from viewpoints different from each other; and a generating step of generating third image data, corresponding to the same viewpoint as the first and second image data, by performing weighted combination of the first image data and the second image data, the third image data having a third angle of view determined according to a user command, wherein the third image data has an angle of view that is smaller than the first angle of view but is larger than the second angle of view, wherein in the generating step, weights on the first image data and the second image data used for the weighted combination are determined such that the closer the third angle of view is to the second angle of view, the larger the weight on the second image data is relative to the weight on the first image data, and the weighted combination of the first image data and the second image data is performed using the determined weights.

16. An image-processing apparatus, comprising:

an obtaining unit configured to obtain first image data having a first angle of view obtained by image-capturing and second image data having a second angle of view smaller than the first angle of view, the second image data being image data corresponding to the same viewpoint as the first image data, wherein the second image data has been generated using fourth image data and fifth image data each having the second angle of view and each captured from viewpoints different from each other; and a generating unit configured to generate a third image data, corresponding to the same viewpoint as the first image data and the second image data, using the first image data and the second image data which is digitally zoomed between the first angle of view and the second angle of view such that the first image data and the second image data change smoothly from one another.

* * * * *